United States Patent [19]

Nguyen et al.

[11] Patent Number: 5,667,885
[45] Date of Patent: Sep. 16, 1997

[54] REINFORCED FILMS MADE FROM WATER SOLUBLE POLYMERS

[75] Inventors: Charles C. Nguyen; Verne J. Martin, both of Cedar Rapids; Edward P. Pauley, Jesup, all of Iowa; Henry L. Buccigross, Lexington; Stephen Rudolph, Carlisle, both of Mass.

[73] Assignee: Penford Products Company, Cedar Rapids, Iowa

[21] Appl. No.: 649,946

[22] Filed: May 14, 1996

Related U.S. Application Data

[62] Division of Ser. No. 458,451, Jun. 2, 1995, Pat. No. 5,565,509, which is a division of Ser. No. 409,878, Mar. 24, 1995, Pat. No. 5,527,544, which is a division of Ser. No. 810,646, Dec. 19, 1991, Pat. No. 5,416,181, which is a continuation-in-part of Ser. No. 650,965, Feb. 5, 1991, abandoned, which is a continuation-in-part of Ser. No. 472,632, Feb. 5, 1990, Pat. No. 5,003,022, which is a continuation-in-part of Ser. No. 309,248, Feb. 10, 1989, abandoned.

[51] Int. Cl.$^6$ .................................................. B32B 5/16
[52] U.S. Cl. ...................... 428/327; 427/212; 428/402; 428/407; 428/537.5; 524/47
[58] Field of Search ............... 428/327, 402, 428/407, 537.5, 535; 427/212; 527/300, 303, 313, 314, 315; 524/47, 48, 49, 50, 51, 52, 53, 54, 55, 56, 57, 58; 525/56

[56] References Cited

U.S. PATENT DOCUMENTS

| | | | |
|---|---|---|---|
| 2,800,463 | 7/1957 | Morrison | 523/309 |
| 2,914,495 | 11/1959 | Gordon | 524/47 |
| 2,922,768 | 1/1960 | Mino | 524/732 |
| 3,061,471 | 10/1962 | Brockway et al. | 428/395 |
| 3,061,472 | 10/1962 | Brockway | 428/395 |
| 3,095,391 | 6/1963 | Brockway | 524/47 |
| 3,104,234 | 9/1963 | Bray, Jr. | 523/220 |
| 3,138,564 | 6/1964 | Borunsky | 524/47 |
| 3,256,221 | 6/1966 | Cooper | 524/44 |
| 3,305,500 | 2/1967 | Downer et al. | 524/47 |
| 3,332,897 | 7/1967 | Ray-Chaudhuri | 524/47 |
| 3,442,845 | 5/1969 | Columbus et al. | 524/732 |
| 3,632,535 | 1/1972 | Gramera et al. | 524/47 |
| 3,746,671 | 7/1973 | Zima et al. | 524/15 |
| 3,769,248 | 10/1973 | Kovats | 524/47 |
| 3,822,230 | 7/1974 | Nelson | 523/220 |
| 3,853,579 | 12/1974 | Heiser et al. | 117/15 |
| 3,904,567 | 9/1975 | Sung | 523/200 |

(List continued on next page.)

FOREIGN PATENT DOCUMENTS

| | | |
|---|---|---|
| 0 408 099 A1 | 1/1991 | European Pat. Off. . |
| 1419518 | 1/1968 | Germany . |
| 58-185640 | 10/1983 | Japan . |
| 59-30827 | 2/1984 | Japan . |
| 903 433 | 2/1982 | U.S.S.R. . |
| 1 141 135 | 3/1985 | U.S.S.R. . |
| 1 468 997 | 3/1989 | U.S.S.R. . |

OTHER PUBLICATIONS

Moller et al., Abstract: "Novel Starch Containing Polymer Dispersions as Binders for Paper and Board Coating" (Jun. 1989).

Moller et al., "Novel Starch Containing Polymer Disperions as Coating Binders" (May 1990).

*Primary Examiner*—H. Thi Le
*Attorney, Agent, or Firm*—Marshall, O'Toole, Gerstein, Murray & Borun

[57] ABSTRACT

A dried film reinforced with coalescable water insoluble polymer particles which are substantially noncoalesced is disclosed. Also disclosed are dried films reinforced with noncoalesced water insoluble polymer particles which are readily water dispersible. Also disclosed are stable aqueous dispersions for formation of such films which comprise (a) a water insoluble component comprising coalescable polymer particles which have a $T_g$ less than 55° C. and a majority of which have a particle size of less than 1 micron; and (b) a water soluble component which comprises a water soluble polymer capable of inhibiting coalescence of the polymer particles, or a water soluble polymer and a component capable of inhibiting coalescence of the polymer particles.

9 Claims, 10 Drawing Sheets

U.S. PATENT DOCUMENTS

| | | | |
|---|---|---|---|
| 3,935,099 | 1/1976 | Weaver | 252/312 |
| 3,950,302 | 4/1976 | Rauterkus et al. | 524/732 |
| 3,968,063 | 7/1976 | Sung | 524/31 |
| 3,976,552 | 8/1976 | Fanta et al. | 524/47 |
| 3,984,361 | 10/1976 | Gugliemelli | 527/301 |
| 4,029,616 | 6/1977 | Nakashio | 524/47 |
| 4,109,056 | 8/1978 | Craig et al. | 428/512 |
| 4,116,899 | 9/1978 | Fanta et al. | 527/301 |
| 4,156,664 | 5/1979 | Skinner et al. | 527/301 |
| 4,189,415 | 2/1980 | Eck et al. | 524/732 |
| 4,192,783 | 3/1980 | Bomball | 106/130 |
| 4,196,259 | 4/1980 | Augustin et al. | 428/492 |
| 4,204,983 | 5/1980 | Swarthout | 527/301 |
| 4,228,047 | 10/1980 | Pippin et al. | 524/47 |
| 4,258,104 | 3/1981 | Lee et al. | 428/342 |
| 4,301,017 | 11/1981 | Kightlinger et al. | 527/301 |
| 4,322,322 | 3/1982 | Lambrechts et al. | 524/734 |
| 4,375,535 | 3/1983 | Kightliner et al. | 527/313 |
| 4,477,535 | 10/1984 | Sinclair | 428/476.3 |
| 4,515,914 | 5/1985 | Tsurumi et al. | 523/201 |
| 4,528,315 | 7/1985 | Eck et al. | 524/458 |
| 4,552,940 | 11/1985 | Van Eenam | 527/312 |
| 4,560,724 | 12/1985 | Brabetz et al. | 524/734 |
| 4,567,099 | 1/1986 | Van Gilder | 428/327 |
| 4,575,525 | 3/1986 | Wacome et al. | 524/48 |
| 4,600,439 | 7/1986 | Schneider et al. | 106/137 |
| 4,705,825 | 11/1987 | Symes et al. | 524/732 |
| 4,839,450 | 6/1989 | Fanta et al. | 527/313 |
| 4,855,212 | 8/1989 | Degen et al. | 524/734 |
| 4,855,343 | 8/1989 | Degen et al. | 524/47 |
| 4,859,751 | 8/1989 | Schulze et al. | 526/200 |
| 5,003,022 | 3/1991 | Nguyen et al. | 527/300 |
| 5,004,767 | 4/1991 | Krause et al. | 524/30 |
| 5,026,746 | 6/1991 | Floyd et al. | 524/50 |
| 5,055,541 | 10/1991 | Floyd et al. | 527/300 |
| 5,130,394 | 7/1992 | Nguyen et al. | 527/300 |

FIG. IA
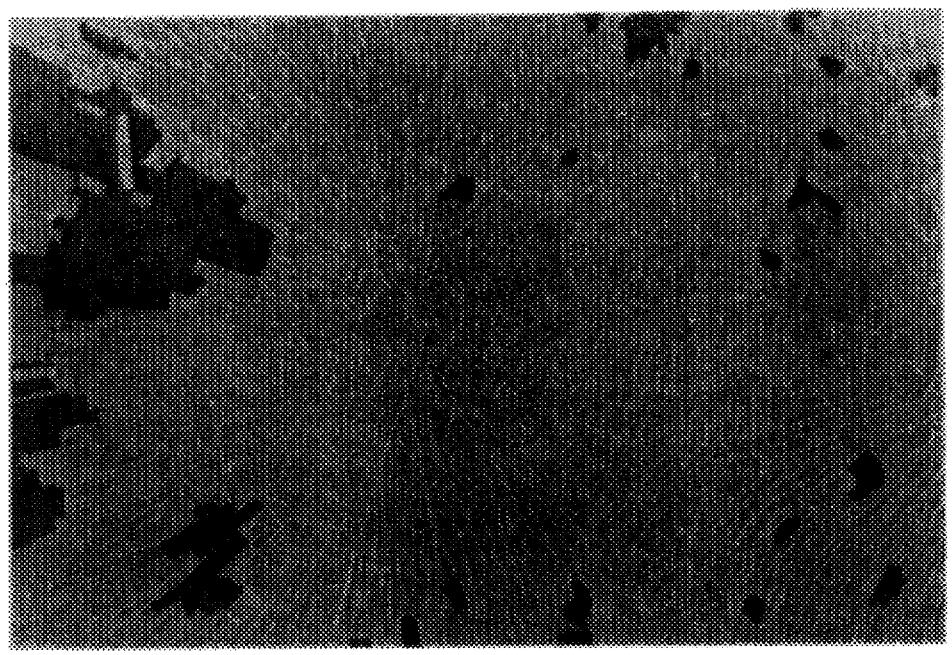
FIG. IB

FIG. IC
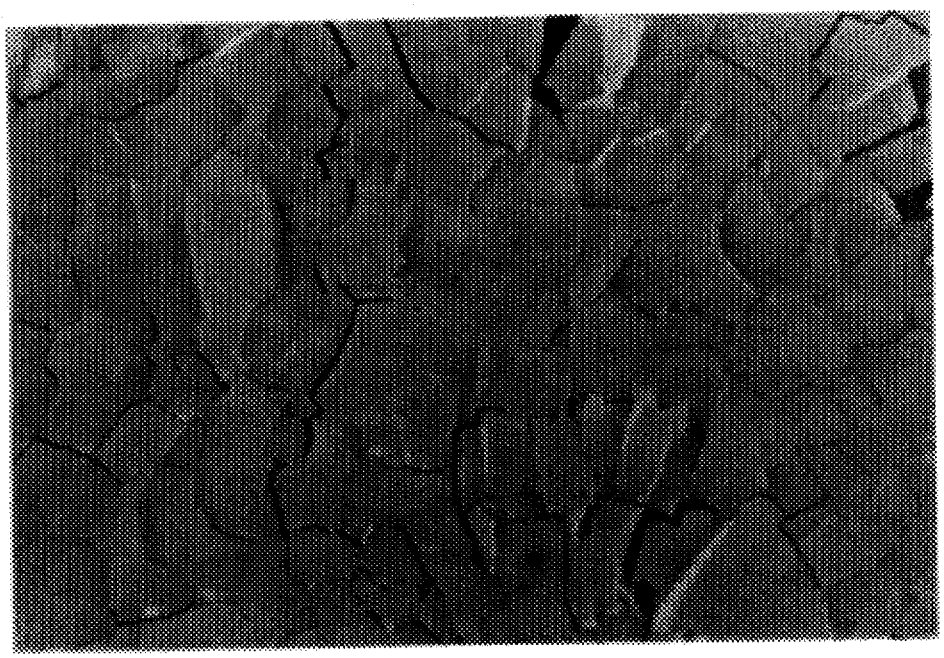
FIG. ID

FIG. IE
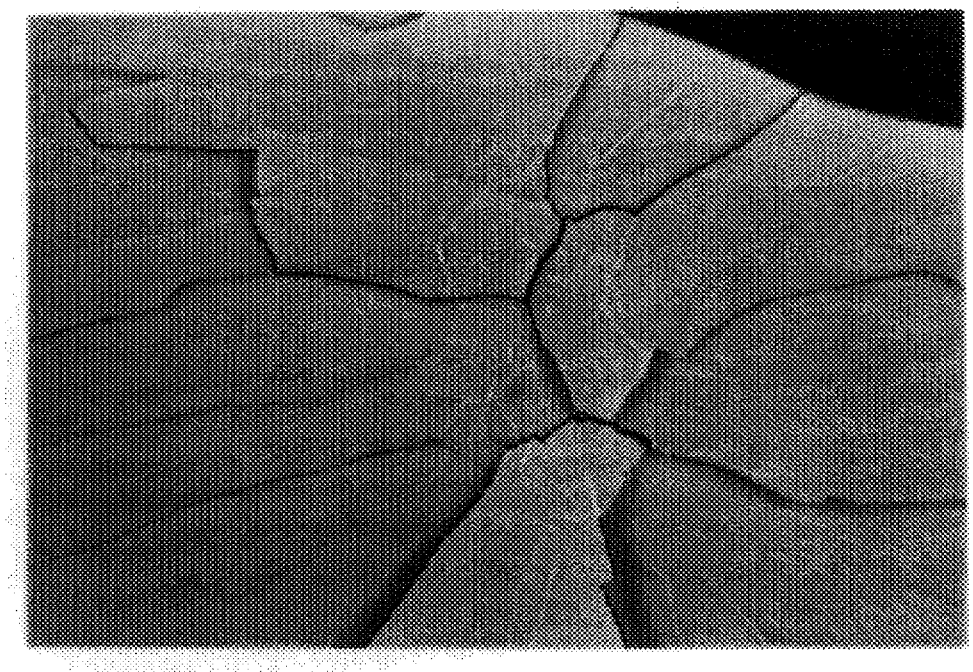
FIG. IF

FIG. IG
FIG. IH
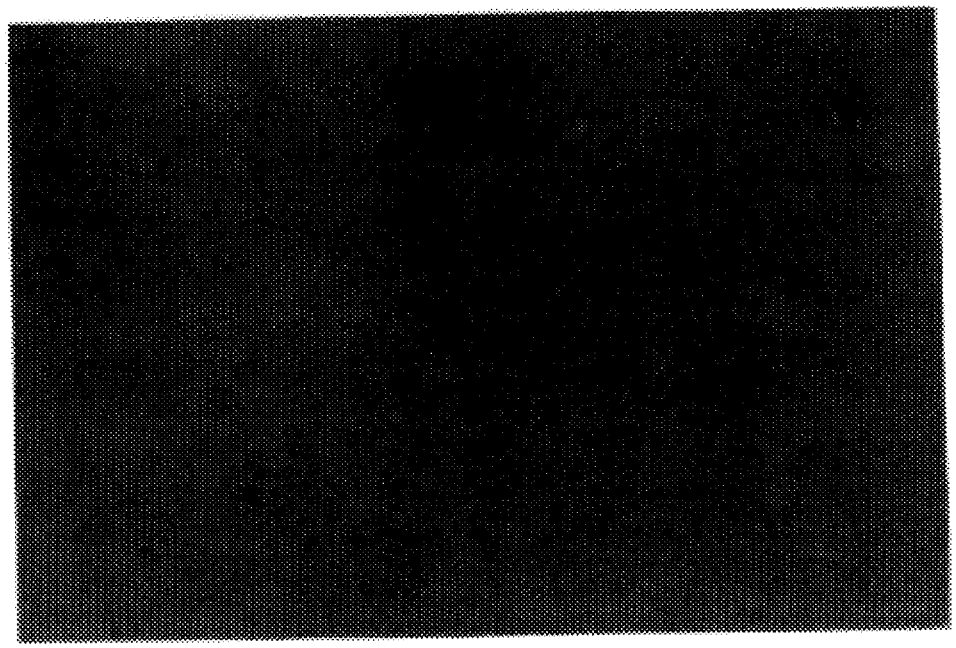

REINFORCED FILMS MADE FROM WATER SOLUBLE POLYMERS

This is a divisional of U.S. application Ser. No. 08/458,451, filed Jun. 2, 1995 now U.S. Pat. No. 5,565,509 which is a divisional of U.S. application Ser. No. 08/409,878, filed Mar. 24, 1995, now U.S. Pat. No. 5,527,544, which is a divisional of U.S. application Ser. No. 07/810,646, filed Dec. 19, 1991, now U.S. Pat. No. 5,416,181 which is a continuation-in-part of application Ser. No. 07/650,965 filed Feb. 5, 1991, now abandoned, which is a continuation-in-part of Ser. No. 07/472,632 filed Feb. 5, 1990 which issued as U.S. Pat. No. 5,003,022 on Mar. 26, 1991 which is a continuation-in-part of application Ser. No. 07/309,248 filed Feb. 10, 1989 now abandoned.

BACKGROUND OF THE INVENTION

The present invention relates to reinforced films of water soluble polymers and stable polymeric dispersions which can be dried to produce such films. Specifically, the invention relates to dried films of water soluble polymers reinforced with noncoalesced water insoluble polymer particles where the film comprises a water insoluble component and a water soluble component.

Starch is a water soluble film forming polymer but starch films are not used in many applications because they are brittle, generally low in strength, do not give substantial gloss in paper coatings, and are frequently incompatible when mixed with other polymers. Although the best starch films are thought to be formed by starch polymers having high molecular weights and high concentrations of straight chain polymers, such aqueous solutions of starches have undesirably high viscosities (it being understood in the art that starch is a water soluble polymer). Thus, to prepare strong starch films, very dilute starch solutions are used, which require the removal of very large amounts of water through an expensive drying operation.

One way to reduce the viscosity and increase the solids prior to film formation is to thin the starch by hydrolyzing the starch polymer chains. Unfortunately, such thinning reduces the strength and flexibility of the resulting film. As the starch films are dried, the polymer chains hydrogen bond to one another resulting in a great deal of shrinkage. Shrinkage leads to the creation of stresses in the finished film, which can distort, craze, curl, or crack the film. In addition, hydrogen bonding between starch molecules causes a phenomenon known as "retrogradation" or "setback." In this case, the chains can bond together so strongly that they will not redisperse, even in boiling water. Other carbohydrate and non-carbohydrate film forming water soluble polymers suffer from many of these same problems. Various attempts have been made in the art to improve the properties of starch and other water soluble films but most have provided only marginal improvements in properties. One improvement of interest has been to increase the linear chain fraction of starch, which is amylose. While this has provided films with increased strength, the films have had limited utility because of high cost, difficulty of dispersing the original high amylose starch granules, and increased ease of retrogradation of the linear molecules. To be useful, these film have required addition of plasticizers or humectants. Again, other carbohydrate as well as many non-carbohydrate water soluble film formers have similar difficulties.

Mixtures of starch or other water soluble polymers and latexes have been used as film forming compositions for a long time. However, in these cases, the films which are formed consist of regions of coalesced water insoluble latex polymer particles interspersed with domains rich in the hydrophilic water soluble polymer. It is believed that the formation of a film from latex by coalescence involves a first step of water loss followed by association of the polymer particles ultimately followed by intermixture of polymer chains resulting in loss of the discrete particle structure.

These films from mixtures of water soluble polymers and latexes are thought to consist primarily of a coalesced latex continuous phase, interspersed with regions or domains rich in the water soluble polymer. No effort is made to prevent the latex from coalescing. Indeed, efforts are made to encourage coalescence of the water insoluble polymer particles because it is believed that such coalescence is necessary to form a continuous film having desirable properties including strength.

One area where such materials are used has been in paper coating. In paper coating applications starch is often blended with latex to form the binder system which, when mixed with pigment, forms a basic coating color. Unfortunately, films with coalesced polymer particles used as binders in paper coating compositions tend to shrink. They also have greatly reduced water dispersibility compared to water soluble polymers. Moreover, when latex particles coalesce to form a film, the resulting shrinkage can contribute to mottle-type defects which can be deleterious to gloss. Coatings comprising starch alone as a binder are weak and tend to shrink, resulting in a rough surface having low gloss. Thus, there exists a need in the art for aqueous dispersions having improved film forming properties which can be used as binders in coating color compositions and other end uses.

SUMMARY OF THE INVENTION

The present invention relates to reinforced films including readily water dispersible films and stable polymeric dispersions which can be dried to produce such films. Specifically, the invention relates to films comprising a water insoluble component and a water soluble component reinforced with water insoluble polymer particles, which, although coalescable, are substantially noncoalesced. Such films may be readily redispersible in water but need not be. While not wishing to be bound by any theory of invention, it is believed that the substantial absence of coalescence of the coalescable water insoluble particles renders the films readily redispersible assuming that no separate provision has been made for crosslinking or insolubilization. The invention also provides stable aqueous dispersions capable of producing such reinforced films. The stable polymeric dispersions can comprise blends of water insoluble and water soluble components or the product of a polymerization reaction of one or more unsaturated monomers carried out in the presence of the water soluble components. Such reaction products include graft copolymers including starch graft copolymers. The aqueous dispersions are characterized by the capability of forming when subjected to atmospheric drying at about 70° F. a film reinforced with noncoalesced water insoluble polymer particles. While it is possible to coalesce the water insoluble polymer particles under other temperatures and conditions, the dispersions of the invention can all form films reinforced with noncoalesced coalescable particles when dried at about 70° F.

The aqueous polymeric dispersions and films provided by the invention are characterized by unique properties which are valuable in coating applications generally and paper coating applications in particular. Specifically, films produced using the dispersions of the invention are characterized by high levels of strength and toughness. When the dispersions are used as binders in coating color compositions, high levels of print gloss result. The films comprise a continuous phase of water-soluble-polymer reinforced with noncoalesced submicron sized particles which provide toughness and mechanical strength to the film. The noncoalesced particles also absorb shrinkage stresses and can thus help provide a smooth continuous film surface.

In cases where readily water dispersible films are provided, the invention provides dried powders capable of being conveniently redispersed in water to form stable aqueous dispersions and methods of preparing and dispersing same. In addition, the invention provides coating color compositions comprising the aqueous dispersions of the invention including coating color compositions comprising greater than 60% solids by weight along with methods of coating substrates including paper and substrates coated thereby.

The dry, stable reaction products and blends of the invention provide a variety of advantages. Specifically, the products are capable of being redispersible when added to water and will have substantially the same physical properties including particle sizes after they are dried and redispersed as before they were initially dried. This leads to numerous commercial advantages including the ability to make and store a dry product that later can be conveniently redispersed. The dry redispersible products can reduce the costs of shipping materials, such as coating color binders, there being no water to ship. The invention also provides the ability to make and store a dry product for extended periods where that product might not have been capable of being stored as a stable liquid dispersion for the same period of time. The invention also provides the ability to rehydrate a dry material to a higher solids concentration than the solids concentration at which it was originally made. Moreover, the dry product can be used directly as a dry material in applications where a liquid could not be used. Alternatively, it can be used dry in applications such as by adding it directly to an aqueous dispersion comprising a coating color pigment.

BRIEF DESCRIPTION OF THE FIGURES

FIG. 1a is a photograph of 100% enzyme thinned starch film;

FIG. 1b is a photograph of an enzyme thinned starch film including 3% latex by weight;

FIG. 1c is a photograph of an enzyme thinned starch film including 6% latex by weight;

FIG. 1d is a photograph of an enzyme thinned starch film including 12% latex by weight;

FIG. 1e is a photograph of an enzyme thinned starch film including 24% latex by weights;

FIG. 1f is a photograph of an enzyme thinned starch film including 30% latex by weight;

FIG. 1g is a photograph of an enzyme thinned starch film including 40% latex by weights;

FIG. 1h is a photograph of an enzyme thinned starch film including 60% latex by weight;

DETAILED DESCRIPTION OF THE INVENTION

Figure 2A:
FIGS. 2a and 2b are photomicrographs depicting a dispersion of a styrene-butadiene/starch reaction product and its reconstituted product.

The present invention provides compositions which greatly improve the properties of films of starch and other water soluble film forming polymers while avoiding the problems which arise in other attempts to improve these properties. The present invention makes use of small water insoluble polymer particles to reinforce the hydrophilic continuous phase of water soluble polymers. This reinforcement by coalescable water insoluble particles gives beneficial properties to the films, such as toughness, tear resistance, and the like. In addition, this reinforcement is particularly important in cases where low molecular weight water soluble polymers are required for higher application solids. Additionally, the properties of films from higher molecular weight water soluble polymers can also benefit from this reinforcement.

Another surprising aspect of the present invention relates to the ability to maintain noncoalesced sub-micron sized hydrophobic polymer particles in a water-soluble-polymer film after drying. The irreversible association of sub-micron sized water insoluble polymer particles upon drying is well known. As water is removed, the particles typically join together in a substantially irreversible manner, properly known in the art as coalescence, but sometimes referred to as coagulation, aggregation or agglomeration. As used herein, the term "coalescence" shall refer to the substantially irreversible combination of particles involving deformation and merging of polymer chains across particle boundaries to create long range order. Most surprising, there is no tendency for the coalescable polymer particles to coalesce even under rather severe conditions of drying at elevated temperatures.

The films of the invention comprise a unique structure wherein they are reinforced by coalescable water insoluble polymer particles which often are elastomeric and which, because they are noncoalesced and distributed uniformly throughout the film, provide toughness and mechanical strength to the film. The films of the invention require the following ingredients: (1) small coalescable water insoluble polymer particles such as are prepared by emulsion polymerization; (2) one or more water soluble polymers; and (3) a component capable of inhibiting coalescence of the water insoluble polymer particles when that function is not provided by the water soluble polymer(s). The dried films of the invention can be produced from stable aqueous dispersions of the invention by coating the dispersions on a surface and drying. Such dispersions comprise a water insoluble component and a water soluble component wherein (a) the water insoluble component comprises coalescable polymer particles which have a glass transition temperature ($T_g$) less than 55° C. and a majority of which have a particle size of less than 1 micron; and (b) the water soluble component comprises a water soluble polymer, such as starch or a starch hydrolyzate, capable of inhibiting coalescence of the polymer particles, or a water soluble polymer and a component capable of inhibiting coalescence such as, but not limited to, a polyol. The coalescable water insoluble particles of the dispersions comprise greater than 3% by weight of the solids. The water soluble component comprises greater than about 25% by weight of said solids. The water soluble polymers can be film forming polymers such as starch, but can also be non-film formers which, nevertheless, form films when carrying out the invention. Nevertheless, when the water soluble component is starch alone, the starch is a starch hydrolyzate product having an intrinsic viscosity of less than 0.12 dl/g.

The invention further can provide a dried powder capable of being conveniently dispersed in water to form a stable aqueous dispersion comprising a water insoluble component and a water soluble component wherein the coalescable water insoluble particles comprise greater than 3% by weight of the solids making up the dispersion while the water soluble component makes up greater than about 25% by weight of said solids. Specifically, the water insoluble component comprises coalescable polymer particles which have a $T_g$ less than 55° C. with a majority of the particles having a particle size of less than 1 micron. The water soluble component comprises a water soluble polymer capable of inhibiting coalescence of said polymer particles or a water soluble polymer and a component capable of inhibiting coalescence of said polymer particles. The dried redispersible powder of the invention can be obtained by preparing the stable aqueous dispersions of the invention and drying the dispersions under conditions selected to avoid coalescence of the water insoluble polymer particles. The dispersions can be dried by a variety of means because there is little tendency to coalesce the particles even under extremes of temperature. Such drying means include spray drying, drum drying and vacuum drying (including freeze drying) with spray drying and freeze drying being preferred. These dispersions can also be treated by selective solvent precipitation. In addition, dispersible powders can be prepared from the redispersible films of the invention by fragmenting the film. The dried powders can be easily transported and can be redispersed in water when an aqueous dispersion is desired.

The stable aqueous dispersions can be prepared by polymerization of unsaturated monomer compounds in the presence of starch or other water soluble polymer components to form a reaction product such as a starch graft copolymer. Alternatively, the dispersions can be prepared by simple blending or mixing of the water insoluble component comprising coalescable polymer particles with the water soluble component including a water soluble polymer and optionally, if needed, a component capable of inhibiting coalescence. A variety of blending methods are possible including (1) adding dry polymer particles to an aqueous dispersion of the water soluble component; (2) adding dry water soluble components to an aqueous dispersion of water insoluble polymer particles; (3) combining dry water insoluble polymer particles with a dry water soluble component and dispersing the dry components in water; and (4) combining an aqueous dispersion of the water soluble component with an aqueous dispersion of the water insoluble polymer particles. The dry blending techniques advantageously allow preparation of dispersions having high solids levels of 60% by weight or more.

According to an additional method, dry redispersible powders may be obtained by selective solvent precipitation. Specifically, an aqueous dispersion such as one containing a styrene/1,3-butadiene starch grafted copolymer (Penford Products Co., Cedar Rapids, Iowa) PENGLOSS®, can be slowly added to a solvent such as isopropanol and be precipitated from the isopropanol and vacuum filtered. The precipitate can then be oven dried and subjected to ball milling to produce a light powder.

The invention also provides coating color compositions comprising a pigment and a binder comprising the dispersion of the invention. The coating colors can also be prepared with high solids levels of 60% solids by weight or greater. The dry materials of the invention can, in fact, be blended directly with a pigment such as clay in a make-down step. The coating colors can be used to coat paper and other substrates by applying to the substrate and drying the coating. Papers coated using the binders of the invention exhibit increased ink gloss, stiffness, brightness and along with opacity, improved porosity and printing quality. These improved properties are believed to result from the reinforced structure provided by the invention.

Water Soluble Component

The water soluble component comprises a water soluble polymer capable of inhibiting coalescence of the coalescable water insoluble polymer particles or a water soluble polymer and a component capable of inhibiting coalescence of the polymer particles. The water soluble component comprises from about 25% to about 97% of the solids content of the final composition. The water soluble component comprises at least about 25% of the total solids because that amount is believed to be the minimum required to allow the film of the invention to be formed. Preferably, the water soluble component comprises from 50% to 80% of the total solids content.

Water soluble polymers useful according to the invention are those which can form films. Suitable water soluble polymers include carbohydrates such as starch derived from different plant sources, including high amylose and high amylopectin varieties. By "starch," as referred to herein, is also meant water soluble film forming polymeric materials derived from starch including starch derivatives such as starch hydrolyzate products, modified starches, modified starch derivatives and maltodextrins. Other water soluble polymers useful with the invention are polyvinyl alcohol, cellulose derivatives, natural polysaccharide gums and their derivatives, polyethylene glycol, water soluble acrylics, water soluble polyesters, polyvinyl pyrrolidone, casein, gelatin, solubilized proteins, polyacrylamide, polyamines, polyquaternary amines, styrene maleic anhydride (SMA) resins, polyethylene amine and any water soluble polymer. Particularly preferred are starch, starch derivatives thereof, modified starches and derivatives, thinned hydroxyalkyl starches, polyvinyl alcohol, cellulose derivatives, polysaccharide gums, polyethylene glycol and maltodextrin. Most preferred are modified starch derivatives and hydrolyzed starches.

One of the advantages provided by this invention is that depolymerization of the water soluble polymer may be carried out to gain the advantage of high solids, low viscosity application and reduced shrinkage without giving up flexibility or strength in the reinforced film. A particularly preferred material is a starch hydrolyzate product thinned such that it has an intrinsic viscosity of less than 0.12 dl/g.

Components Capable of Inhibiting Coalescence

In many cases, the water soluble polymer itself, or components therein, will prevent coalescence of the water insoluble polymer particles. For example, thinned starches including maltodextrins and particularly starch hydrolyzate products having an intrinsic viscosity of less than 0.12 dl/g can prevent coalescence of the water insoluble polymer particles.

In other instances it may be necessary to add an additional material to prevent this coalescence of the water insoluble polymer particles in the water soluble polymer film. Accordingly, a low or intermediate molecular weight component can be incorporated into the water soluble component to inhibit such coalescence. Suitable components include highly water soluble and water miscible components including urea, low molecular weight polyvinyl pyrrolidone (PVP), amino acids and polyols, e.g., glucose, sucrose, maltose, maltodextrins, glycerol, propanediol, sorbitol, pentaerythritol, cyclodextrins, polydextrose, polyvinyl alcohol. Components capable of inhibiting coalescence can be mixed dry or in a liquid solution with dry or dispersed water soluble polymer, or in a mixture of the insoluble particles, or in a mixture of the insoluble polymer particles and the water soluble polymer. Concentrations of 5% or 10% or more of components capable of inhibiting coalescence are typical in practice of the invention but one of ordinary skill in the art can readily determine the suitable concentration to be added for a component given the type and proportions of the film forming polymer and water insoluble component in any particular mixture.

Water Insoluble Components

The water insoluble components comprise coalescable water insoluble polymer particles and optionally comprise noncoalescable water insoluble polymer particles. For the purpose of this invention, a water insoluble polymer particle is considered "coalescable" if a film cast from such polymer particles dispersed in water requires a temperature no higher than 85° C. to coalesce at atmospheric pressure. Particles are considered to coalesce if there is a substantially irreversible combination of particles involving deformation and merging of polymer chains across particle boundaries to create long range order. In addition to the coalescable polymer particles, the water insoluble components can also optionally comprise noncoalescable water insoluble polymer particles that will not coalesce when dried. Such noncoalescable polymer particles include materials such as polystyrene particles and can optionally be present in the water insoluble component of the compositions at concentrations such that they do not interfere with the reinforcement effects of the coalescable water insoluble polymer particles.

The water insoluble polymer particles comprise from about 3% to about 75% by weight of the solids content of the compositions of the invention with 10% to 66% being preferred and 20% to 50% being most preferred.

While applicants do not wish to be limited by any theory, it is believed that the coalescable water insoluble polymer particles reinforce and provide beneficial properties to the films of the invention by absorbing stresses and strains during and after film formation. Additionally, by maintaining the water insoluble particles in a noncoalesced state throughout drying, shrinkage of the film, which would normally occur, is substantially reduced. Further, the formation of relatively large domains of coalesced water insoluble particles within the film is prevented, resulting in a more uniform structure and film surface. This uniformity results in more uniform wetting when the surface of the film is wetted with a wide variety of materials. This provides an advantage when the reinforced film of this invention is applied as a coating binder for coating paper for offset lithography and other printing processes. Relatively large scale variability in the surface of the paper leads to differences in wettability during printing by aqueous fountain solution and non-aqueous ink. Conventional binders comprising latex and starch in which the latex particles coalesce during drying lead to variations in surface wettability. This phenomenon is known in the paper coating art as binder migration, and can result in the printing defect known as mottle.

In practice of the invention, it is preferred that the majority of water insoluble polymer particles have a particle size less than 1 micron with it being particularly preferred that at least 90% of the particles have a particle size of less than 0.5 microns and most preferred that at least 90% of the particles have a particle size of less than 0.3 microns. Although smaller water insoluble polymer particles have a greater tendency to coalesce, they also provide superior reinforcing properties in comparison to an equal mass of larger particles.

The invention is seen as being able to broadly use a variety of water insoluble particles. In particular, particles formed from diene and other unsaturated (vinyl) monomers are suitable for use according to the invention. Such diene monomers include 1,3-butadiene, isoprene, chloroprene, cyclobutadiene and divinyl benzene. Suitable unsaturated monomers include alkyl acrylates, hydroxylated alkyl methacrylates, alkyl vinyl ketones, substituted acrylamides, methacrylic acid, N-methylol acrylamide, 2-hydroxyethyl acrylate, crotonic acid, itaconic acid, fumaric acid, maleic acid, maleic anhydride, vinyl halides, vinylidene halides, vinyl esters, vinyl ethers, vinyl carbazole, N-vinyl pyrrolidone, vinyl pyridene, chlorostyrene, alkyl styrene, ethylene, propylene, isobutylene, vinyl triethoxy silane, vinyl diethylmethyl silane, vinyl methyl dichloro silane, triphenyl vinyl silane, 1-vinyl-1-methysilia-14-crown-5. Preferred monomers include methyl methacrylate, vinyl acetate, acrylonitrile, acrylic acid, acrylamide, maleic anhydride, monovinyl silicon compounds including vinyl trimethyl silane, ethyl vinyl ether, chlorostyrene vinyl pyridine, butyl vinyl ether, 2-ethylhexyl acrylate, isoprene, chloroprene, with vinylidene chloride, butyl vinyl ether and styrene being particularly preferred, and styrene being most preferred.

Of the polymer particles prepared by polymerizing monomers in the above group, particularly preferred are those prepared from ethylene and vinyl acetate and 1,3-butadiene and styrene. Styrene-butadiene latices are particularly preferred and include pure styrene-butadiene latices as well as copolymers of styrene and butadiene with other monomers.

These water insoluble polymer particles can be prepared independently and later mixed in wet or dry state with a water soluble component or they can be prepared by carrying out a reaction in the presence of the water soluble polymers such as disclosed in U.S. Pat. No. 5,003,022, the disclosure of which is hereby incorporated by reference. This patent discloses graft copolymers which are the reaction products of thinned gelatinized starch and one or more vinyl grafting monomers, said vinyl grafting monomers comprising at least 10% diene by weight. It is believed that the polymerization reactions carried out in the presence of starch and other water soluble polymers according to the invention can result in grafting of unsaturated monomers to molecules of the water soluble polymers such as starch. Accordingly, "reaction product" as used herein should be considered as encompassing starch graft copolymers when referring to the products of the peroxide and persulfate initiated reactions described herein.

Chain Transfer Agents

Where the dispersion comprises a "reaction product," conventional chain transfer agents, known to the synthetic rubber industry as "modifiers," may be employed to regulate the molecular weight of the polymer formed. Suitable chain transfer agents include materials such as n-dodecyl mercaptan, n-cetyl mercaptan, bromoform, carbon tetrachloride and the like in amounts ranging from 0.01 to about 5 percent of the monomer weight, with 0.10 to about 1% being preferred.

Initiators

Initiators (catalysts) suitable with the present invention include those materials which act to initiate free radical polymerization on and in the presence of starches and other water soluble polymers to yield the aqueous dispersions of the present invention. The initiation of polymerization on the water soluble polymers can result in grafting. Suitable initiators include organic and inorganic peroxy compounds, azo compounds and persulfate compounds. Hydrogen peroxide and persulfate ion free radical initiators are preferred, with potassium persulfate being particularly preferred to use with derivatized and/or thinned starches according to the methods of the present invention. Persulfates may be used in amounts of at least about 0.01% of the weight of monomers used, but are preferably used in a range of from about 1% to about 10%. Persulfates may be used in solid form. Such use allows production of dispersions with higher solids contents. The persulfate initiator may be used alone or in a mixture with other initiators. In addition, the initiator can be added at once or over the course of the polymerization time.

It is sometimes the case that reducing agents are required to activate the decomposition of the above-identified free-radical initiators. Suitable reducing agents may include ferrous ammonium sulfate, ascorbic acid, sodium bisulfite, sodium metabisulfite and sodium thiosulfate. These reducing agents can be added at once at the beginning or during the course of the reaction.

Surfactants

Surfactants may be used to stabilize the aqueous dispersion and can be added either before reaction or after the reaction is complete. Suitable types of surfactants include anionic, cationic, amphoteric and nonionic surfactants. Care should be used in selecting the surfactant such that it not interfere with the reaction or with the use of the final dispersion in the process of paper coating such as by flocculation of the clay or providing undesirable viscosity in the dispersion. Surfactants may generally be used at levels up to about 10% of the monomer weight, with a level of about 0 to 5% being preferred for use of sodium dodecyl benzene sulfonate.

Reaction Conditions

In the case where the polymeric dispersions of the invention are the products of a free radical initiated polymerization reaction carried out in the presence of a water soluble polymer, that polymer is preferably a thinned derivatized starch. The starches used according to this aspect of the invention are gelatinized by cooking at a solids content of between 20 and 40% (dry basis), with a solids content of between 30 and 40% being especially preferred. The cooked, gelatinized, thinned starch paste is then placed in a reaction vessel capable of containing and withstanding the pressure of the reaction. Regardless of whether starch or other water soluble polymers are used, a variety of monomers can be reacted to form the polymeric dispersions of the invention. A preferred combination of monomers is styrene and 1,3-butadiene. Because of the relatively high volatility of 1,3-butadiene, it (and other gaseous monomers) is reacted under pressure. In general, the more 1,3-butadiene present in the reaction mixture, the higher the pressure at which the reaction is run. Maximum pressures during the reaction are generally between 25 and 300 psig (or more).

One or more surfactants may be added at any time during the reaction process. Preferred amounts, when added, range to as high as 10% based on the total monomer weight, with amounts ranging from 1 to 5% being especially preferred.

The free radical initiator or initiators can be added at any time during the reaction process. A preferred method of free radical initiator addition would have from 1 to 5% (based on total monomer weight) added to the water soluble polymer prior to monomer addition, with up to 5% (based on total monomer weight) being added in increments during the reaction.

The total unsaturated monomer to water soluble polymer weight ratio in the aqueous dispersion is preferably between about 2:10 and about 30:10, and a ratio of between about 6:10 and 8:10 being most preferred. 1,3-Butadiene can be reacted with water soluble polymers in the presence of other monomers. When 1,3-butadiene and styrene are used as the unsaturated monomers, the amount of 1,3-butadiene preferably ranges from at least 10% and preferably up to about 70% by weight of the monomers. Most preferably, the 1,3-butadiene is present at weight concentrations of from about 20% to about 40% in combination with styrene in concentrations of from about 60% to about 80%. The monomer or monomers can be added at the beginning or during the course of polymerization, depending on reaction conditions. The monomers are preferably added after the addition of the surfactant and the free radical initiator. Preferably, the less volatile reactants are added first and the more volatile reactions are added last.

The water soluble polymer/unsaturated monomer reaction can be carried out over a wide temperature range depending on the type of monomers and initiators used. Normally the temperatures would range from 25° to 120° C., with a reaction temperature range of 50° to 90° C. being preferred. The reaction mixture is preferably stirred while it undergoes heating.

A reaction time ranging from about 0.5 to 24 hours after addition of the initial:or is usually adequate to produce a final dispersion with suitable properties. In particular, a reaction time of from about 2 to about 12 hours has been found to be particularly preferred for the production of suitable product.

It is desired that the level of residual monomers is minimized in the final reacted product. Accordingly, a post reaction treatment may be necessary. A preferred treatment comprises the incorporation of additional initiator. The use of steam-vacuum distillation has been found to lower residual styrene concentrations while providing a product with lower viscosity and higher solids. Another method comprises carrying out the reaction at 70° C. for three hours and then at 90° C. for two hours with steam vacuum distillation, while still another method comprises use of a jet cooker to efficiently remove residual monomer.

Coating Colors

Products of the invention in the form of redispersible dry powders can be used advantageously as binders in paper coating processes. Coating color compositions typically comprise pigments such as clay along with binders and a variety of specialty additives such as crosslinkers and lubricants. The liquid coating color is then applied to paper substrates using methods well known in the art and illustrated in several of the examples below.

The binder portion of the coating color typically comprises a blend of latex and starch with latex typically being used as an emulsion at approximately 50% solids. While it is generally desired to use binders with higher solids contents, such binders are not widely available. Starch used in coatings is generally gelatinized or cooked in water at about 30% solids or less. Pigments can be supplied dry or as approximately 70% solids slurries. Thus, when formulating coating colors, total solids can be limited by the amount of water introduced by each of the color components, and it may be very difficult or expensive to raise solids to the maximum which can be run on the particular coating equipment.

The dry redispersible powder of the present invention makes it possible to eliminate the water which normally accompanies the latex and starch present in a coating color, and thereby greatly simplifies preparing coating colors having very high solids levels. Not only does less water need to be removed during the drying operation, but the reduced water content leads to a reduction in gross shrinkage of the coating on the paper on drying. The improved reduced water content improves smoothness and uniformity of the paper coating. The dry redispersible powder of the invention can be redispersed in water at a solids level substantially higher than the original dispersion, and used as such to formulate high solids coating having 60% solids levels or higher. Alternatively, the powder can be added, with mixing, directly to an aqueous slurry of pigment to redisperse the powder in the presence of the pigment. Even when high solids colors are not desired, the powder can be used to advantage in formulating coating colors in any range of solids, and the coating color so created is virtually indistinguishable from a coating color made using the original dispersion prior to drying.

If the dry powder of this invention is used in its most preferred form, the coating color so created is virtually indistinguishable from a coating color made using the original dispersion prior to drying, as determined by examining the properties of paper coated in a similar manner with both colors.

For the purpose of this invention, film refers to a film having a smooth substantially planar continuous surface. While the film can comprise some substantial cracking, it is recognizable to the naked eye as a planar film and not as a powder or particulate coating. A water soluble polymer film is a film wherein the continuous phase consists essentially of water soluble polymer.

For the purpose of this invention, a water insoluble polymer particle is considered "coalescable" if a film cast from such polymer particles dispersed in water requires a temperature no higher than 80° C. to coalesce at atmospheric pressure. Particles are considered to coalesce if there is a substantially irreversible combination of particles involving deformation and merging of polymer chains across the particle boundaries to create long range order. Where an aqueous dispersion comprises a blend of water soluble and water insoluble components, the coalescability of the water insoluble polymer particles may be determined by testing a film of the water insoluble component in the absence of the water soluble components which might comprise components which inhibit coalescence.

Where the aqueous dispersion comprises a reaction product, such as a graft copolymer, of water soluble and water insoluble components, it may not be possible to separate all those water soluble components that inhibit coalescence from the water insoluble polymer particles. Accordingly, the coalescability of the reaction product water insoluble polymer particles is determined by evaluation of the coalescability of the polymer particles that would have resulted from carrying out the polymerization reaction in the absence of the water soluble components.

For example, where the water insoluble polymer particles are produced by a styrene/butadiene starch graft polymerization reaction, the particles are considered coalescable if the reaction product of an equivalent styrene/butadiene polymerization reaction would have been coalescable.

For the purpose of this invention, a material is considered completely redispersible if it has essentially the same physical properties after it has been dried and redispersed without heating or extreme agitation as it exhibited as an aqueous dispersion before it was dried. A material is considered completely redispersible if it passes the following test. According to this test, a dried film or powder is placed on a microscope slide where it is examined under a binocular microscope with a magnification range of 10–70×. A drop of distilled water at room temperature is placed on the slide and the film or powder is observed over a 10 minute period. The ability of the dried material to disperse into the drop of water is then evaluated. Where the material contacted by the drop appears to form a white dispersion of particles similar in appearance to a latex without the application of heat, agitation, or probing, the material is considered to be completely redispersible according to the invention. Furthermore, the material is considered to be both completely and readily redispersible if it appears to turn to white "smoke" when contacted by water and the components, both water soluble and insoluble, travel into the water drop rapidly at the beginning of the 10 minute test without application of heat, agitation or probing. Thus, readily redispersible materials are a special subset of completely redispersible materials where the redispersion phenomenon occurs especially rapidly. In order to pass these tests, it is not necessary that all the film or powder contacted by the drop of water be dispersed by the single drop of water. Nevertheless, if the film merely whitens or breaks into chunks or requires probing to break up and does not produce "smoke" or a white dispersion of particles as described above, it does not qualify as being completely or readily dispersible.

Based on the above definitions of redispersibility, it is discovered that a number of starch/unsaturated monomer reaction products, including a commercial starch grafted copolymer, PENGLOSS® (Penford Products Co., Cedar Rapids, Iowa), and blends of commercial latex polymer particles and carbohydrates, exhibit the unusual ability to be dried to produce a film or powder and be completely and readily redispersed. The ability of a film to redisperse is dependent on the type of water soluble polymer used, the size of the polymer molecule, the nature and amount of substitution on the polymer, the type of water insoluble polymer particle with which it is combined, or the type and amount(s) of monomer(s) with which it is reacted, and the method used to dry the material. According to one aspect of the invention, certain substituted and/or thinned water soluble polymers exhibit the ability to stabilize a latex dispersion. In addition, it has been found that the water soluble polymers allow the starch/vinyl monomer reaction product or blends of commercial latices and substituted and/or thinned carbohydrates to be dried and redispersed such that the materials have essentially the same physical properties, including particle size, after they have been dried and redispersed as they had before they were dried to form a film or powder.

Completely redispersible films and powders according to the invention include latex/carbohydrate blends or starch/unsaturated monomer reaction products, that are used as binders in coating color compositions in paper coatings. Papers coated with coating colors containing binders made from redispersed materials would have essentially the same properties, as measured by gloss and dry pick strength, as the papers coated with coating colors containing binders made from the same materials before they were dried and redispersed.

EXAMPLES

Example 1 discloses water soluble films reinforced with increasing amounts of coalescable water insoluble particles.

Example 2 discloses transmission electron micrographs of dispersions of the invention before and after drying and redispersion. Example 3 discloses scanning electron micrographs of films with and without substantially noncoalesced polymer particles.

Example 1

In this example, blends of a coalescable styrene/butadiene latex with a $T_g$ of 12.0° C. (Dow 620 latex, Dow Chemical Co., Midland, Mich.) and an enzyme thinned lightly oxidized hydroxyethyl starch ether product having a DE of 10 (enzyme thinned Pencote®, Penford Products Co., Cedar Rapids, Iowa) were blended at various ratios and dried to produce reinforced films. The styrene/butadiene latices in these films were noncoalesced and served to reinforce the films and relieve cracking stresses.

Referring to FIG. 1a, a film comprising 100% of the thinned starch and no latex is significantly cracked and crazed. Referring to FIG. 1b, the film comprising 3% latex particles is considered to constitute a water soluble polymer film reinforced with coalescable polymer particles according to the invention. The presence of even 3% elastomeric latex particles is seen to produce a better film by absorbing and relieving shrinkage stresses. Even though the film includes numerous cracks, the nature of the film is such that it provides improved properties to paper coating colors in which it is incorporated as a binder.

FIG. 1c discloses a film comprising 6% latex which has a smoother surface and fewer cracks. FIGS. 1d, 1e, 1f, 1g and 1h disclose, respectively, films comprising 12%, 24%, 30%, 40% and 60% latex, illustrate further improved film properties and reinforcement and stress relief provided by the noncoalesced latex particles. By the time the latex concentration reached 30% by weight, the film is almost totally smooth and devoid of cracks. At 40% and 60% concentrations, the films are devoid of all cracks.

Example 2

In this example, electron microscopy was used to examine the particles of a dispersion comprising styrene-butadiene/ starch reaction product and a physical blend of Dow 620 latex with enzyme thinned starch, before and after drying and redispersion.

Figure 2B:
Figure 3A:
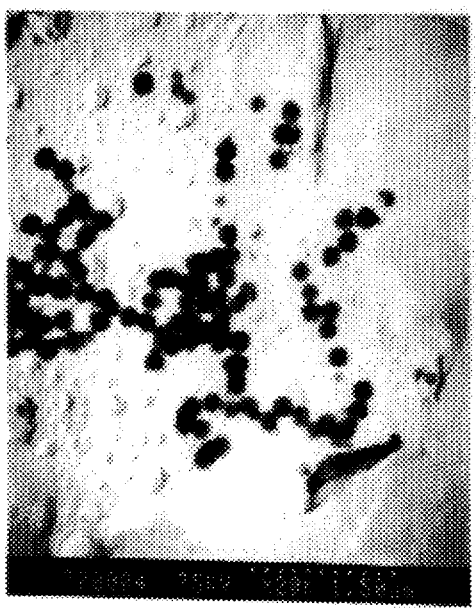
FIGS. 3a and 3b are photomicrographs depicting a dispersion comprising a blend of latex and starch and its reconstituted product.
Figure 3B:
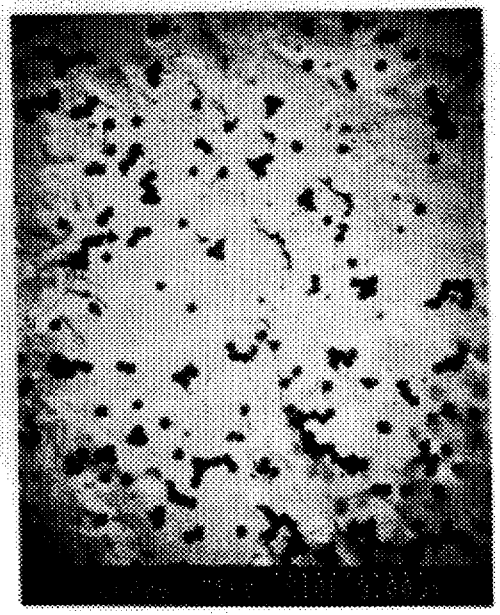

Films of a styrene-butadiene/starch reaction product dispersion with a monomer/starch ratio of 60/100, a solids of 45.6% dry substance basis and a $T_g$ of 14.5° C. (PENGLOSS® binder, Penford Products Co., Cedar Rapids, Iowa), and a physical bland of Dow 620 latex and enzyme thinned lightly oxidized hydroxyethyl starch ether product (enzyme thinned Pencote®), at a latex/starch ratio of 62/100 and a solids of 45% dry substance basis, were dried at room temperature and redispersed with ion exchanged water. For the electron microscopy examination, the dispersions were diluted to 0.5% solids with distilled water, and a small drop of each sample was sandwiched between two copper sheets, fast-frozen in a liquid cryogen and transferred to a vacuum chamber equipped with a cold stage. There, the sample was fractured, etched and then coated with an ultra-thin, conducting platinum and carbon supporting film. The metal film was then removed, cleaned with acid and washed thoroughly with distilled water. The metal supporting film which contains the shadows of dispersion particles was then imaged in a Transmission Electron Microscope (TEM), (model H-7000, Hitachi). FIG. 2a shows a TEM photograph of styrene-butadiene/starch reaction product dispersions of PENGLOSS® binder at 20,000× and FIG. 2b shows reconstituted PENGLOSS® binder at 20,000×. FIG. 3a illustrates the TEM of Dow latex-enzyme thinned starch blend and FIG. 3b shows its reconstituted product at 10,000×. It is clearly indicated that after being dried and redispersed, the polymer particles of these dispersions are noncoalesced and still maintain their original distinct sizes and shapes.

Example 3

In this example, various films were evaluated by means of a scanning electron microscope to directly determine whether water insoluble polymer particles were coalesced. While films that are readily or completely dispersible will necessarily have noncoalesced polymer particles, there can still exist films having noncoalesced particles which are not readily dispersible. Such films include those that comprise retrograded starch or a crosslinked water soluble component.

Films were produced from dispersions including (A) a 100% styrene/butadiene latex dispersion (Dow 620 Latex); (B) styrene/butadiene latex (Dow 620 Latex) blended at a 1:2 weight ratio with a thin hydroxyethyl starch ether product (Pencote® starch); (C) styrene/butadiene latex (Dow Latex 620) blended at a 1:2 weight ratio with an enzyme thinned hydroxyethyl starch ether product (E.T. Pencote® starch) which was significantly thinner than the product of (B); and a styrene/butadiene starch graft copolymer dispersion (PENGLOSS® binder) comprising 1 part initial monomer per 2 parts starch.

The dried films were fractured so the freshly fractured edge could be examined. In cases where the wafer was too pliable to fracture easily, the samples were dipped momentarily into liquid nitrogen and then fractured. The fractured slivers and a flat wafer piece were mounted on stubs using copper tape. The slivers were oriented so that the fractured surface faced up to allow easy examination. The specimens were sputter-coated for 3 minutes with gold-paladium in the presence of Argon gas prior to examination in the JEOL JSM-840 scanning electron microscope.

Figure 4A:
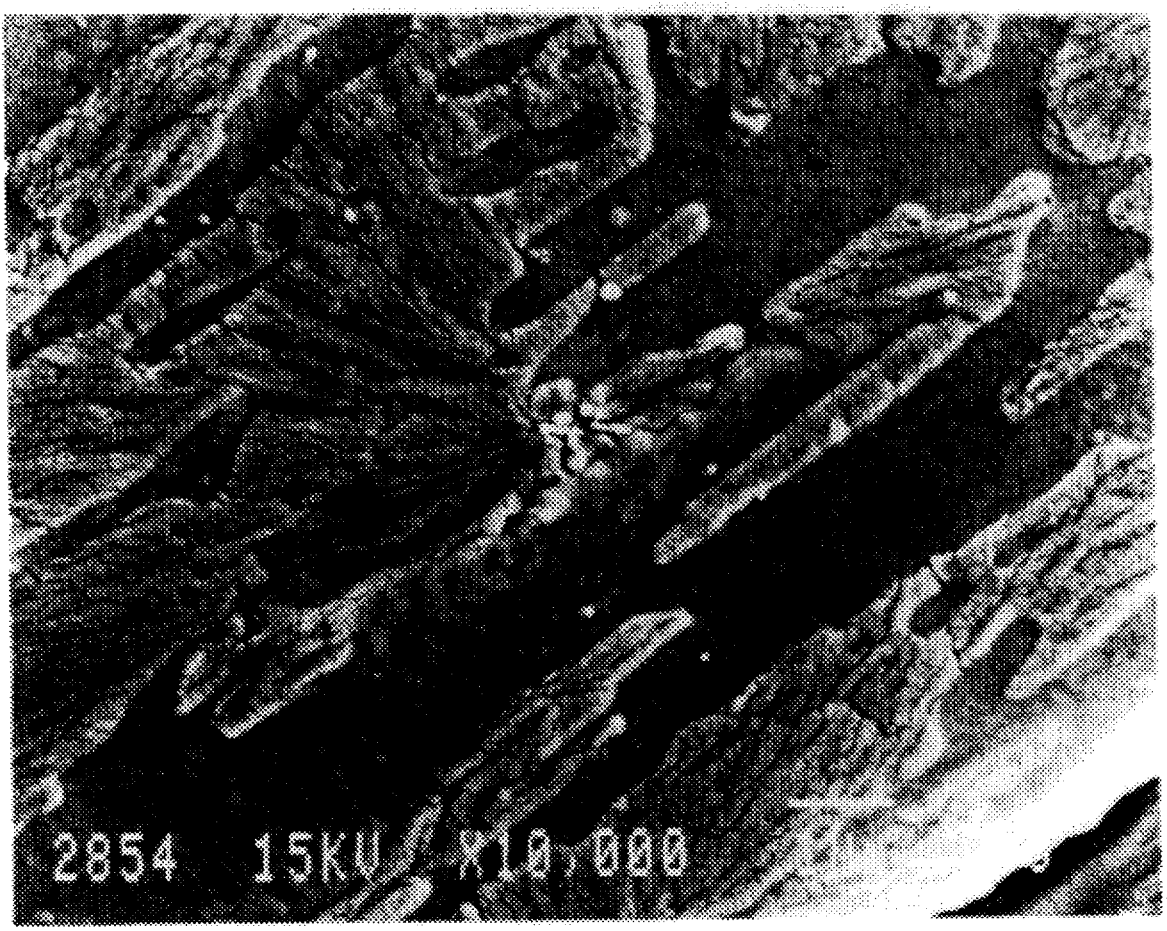
FIG. 4a is a scanning electron micrograph of a latex film.
Figure 4B:
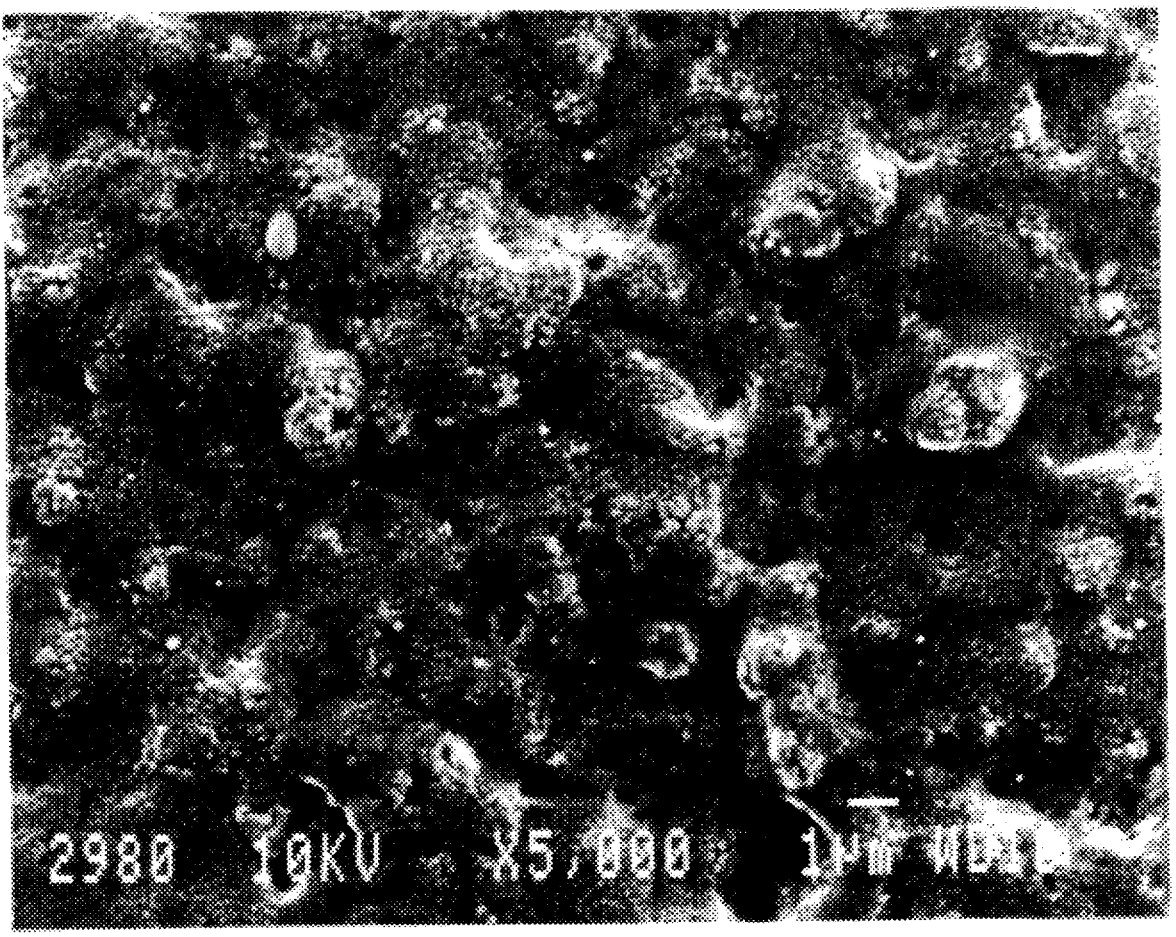
FIG. 4b is a scanning electron micrograph of a latex/starch blend film.
Figure 4C:
FIG. 4c is a scanning electron micrograph of a latex/enzyme thinned starch blend film.
Figure 4D:
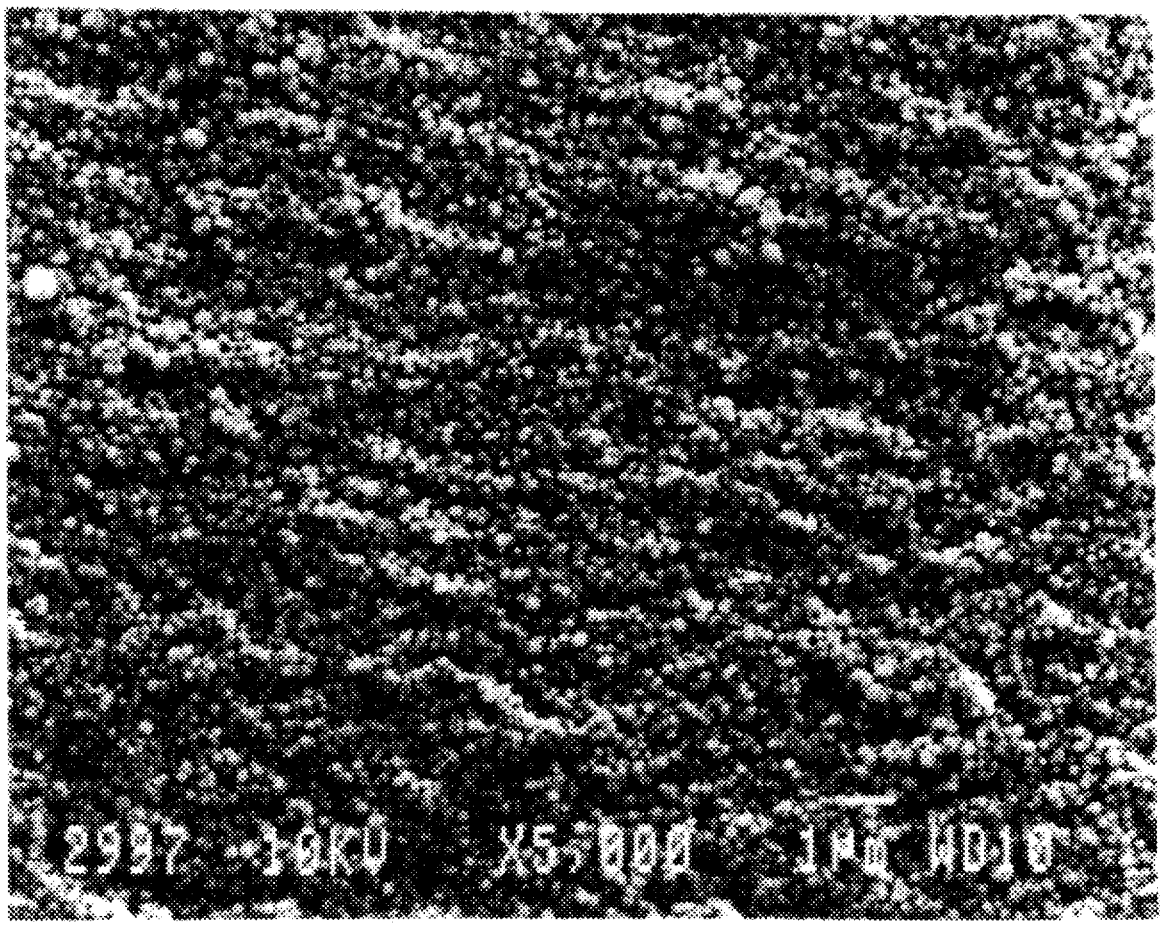
FIG. 4d is a scanning electron micrograph of a styrene/butadiene starch graft copolymer film.

Referring to FIGS. 4a–4d, the latex particles of the 100% latex film in FIG. 4a are seen to be entirely coalesced in contrast to the polymer particles of the films produced by the latex/enzyme thinned starch blend of FIG. 4c and the starch graft copolymer of FIG. 4d. The latex particles of the latex/starch blend of FIG. 4b are substantially coalesced. The coalesced particles render the film not completely dispersible. As such, that film is not considered to fall within the scope of the invention.

In Examples 4–9, various blends of water soluble and water insoluble components were prepared as aqueous dispersions. Films were cast from the resulting dispersions and examined as described below to determine the degree of redispersibility of the dried film. Based on those examinations, conclusions were drawn regarding coalescence of the coalescable water insoluble polymer particles present in those films. Specifically, where the dried film remained intact and failed to be readily and/or completely redispersible, it was concluded that the water insoluble polymer particles in the film had coalesced. Such conclusions can be drawn because a film in which the water insoluble polymer particles are coalesced is neither readily nor completely redispersible. In cases where the dried film partially dispersed upon application of a drop of water and the film remained mainly intact, it was concluded that the insoluble polymer particles had partly or mainly coalesced. Where a film was readily or completely dispersible upon application of a drop of distilled water, it was concluded that the insoluble polymer particles had not coalesced.

Example 4

Blends were created from among the following materials: a commercial available carboxylated styrene-butadiene latex (Dow CP620NA), a solution of cooked Pencote® starch, and a dextrose solution. Blends were made in the ratios (solids basis) by weight described in Table 1 below. A latex only sample was included as a control (A).

TABLE 1

| | (Parts by Weight) | | | | |
|---|---|---|---|---|---|
| | A | B | C | D | E |
| Dow 620 Latex | 100 | 30 | 30 | 30 | 80 |
| Pencote ® Starch | — | 70 | 67 | 64 | — |
| Dextrose | — | — | 3 | 6 | 20 |

Films of the materials described above were cast on glass microscope slides and allowed to dry thoroughly at room temperature (about 70° F.) for 18 hours. The dispersions of Runs A–D dried to dried to substantially uniform crack-free films. Dispersion E was very slow to dry as a result of the water forming properties of the dextrose, and did not form a film. The dried samples were then examined under a binocular microscope with a magnification range of 10–70× in the following fashion. A drop of distilled water at room temperature was placed on the sample and observed over a 10 minute period. The following observations were made as to the redispersibility of the wetted samples, and conclusions were drawn as to the coalescence of water insoluble particles in the samples.

TABLE 2

| Film | Microscopic Observation | Conclusion |
|---|---|---|
| A | Film remains intact. | Coalesced |
| B | Film remains intact. | Coalesced |
| C | Film is less tough than B but remains intact. | Mainly Coalesced |
| D | Film readily disperses. A milky dispersion of particles is apparent within a few seconds. Nearly complete to complete redispersibility. | Not Coalesced |
| E | Sample readily disperses. A milky dispersion of latex is immediately apparent. Complete redispersibility. | Not Coalesced |

Example 5

Blends were created from among the following materials: a commercially available carboxylated styrene-butadiene latex (Dow CP620NA available from Dow Chemical Co.), a solution of a cooked Pencote® starch, a thin, lightly oxidized hydroxyethyl starch ether product (supplied by Penford Products Co.) and a solution of enzyme-thinned Pencote® (ET Pencotes) starch, Penford Products Co. Blends were made in the ratios (solids basis) described in Table 3 below.

TABLE 3

| | (Parts by Weight) | | | | |
|---|---|---|---|---|---|
| | A | B | C | D | E |
| Dow 620 Latex | 30 | 30 | 30 | 30 | — |
| Pencote ® Starch | 70 | 67 | 61 | 0 | — |
| ET Pencote ® Starch | 0 | 3 | 9 | 70 | — |
| PENGLOSS® | — | — | — | — | 100 |

The dispersions described above were cast on glass microscope slides and allowed to dry thoroughly at room temperature. A film of PENGLOSS® binder (Penford Products Co., a styrene/butadiene enzyme thinned starch reaction product produced according to the methods of U.S. Pat. No. 5,003,022) designated as "E" was included in the comparison. The dried films were continuous and crack free. Films were then examined under a binocular microscope with a magnification range of 10–70× in the following fashion. A drop of distilled water was placed on each film which was observed over a 10 minute period to determine if it was readily dispersible. The following observations were made.

TABLE 4

| Film | Observation | Conclusion |
|---|---|---|
| A | Film remains intact and tough. | Coalesced |
| B | Film though less tough than A, remains mainly intact. | Coalesced |
| C | Film disperses. A milky dispersion of particles is apparent within a few minutes. Nearly complete to complete redispersibility. | Not Coalesced |
| D | Film is readily dispersible and a milky dispersion of particles is immediately apparent. Complete redispersibility. | Not Coalesced |
| E | Film is readily dispersible and a milky dispersion of particles is immediately apparent. Complete redispersibility. | Not Coalesced |

Example 6

Blends were created from among the following materials: a commercially available carboxylated styrene-butadiene latex (Dow CP620NA available from Dow Chemical Co.), a solution of partially hydrolyzed polyvinyl alcohol (Airvol 203-Air Products & Chemicals Inc.) and a dextrose solution. Blends were prepared in the ratios (solids basis) described in Table 5 below.

TABLE 5

| | (Parts by Weight) | | | |
|---|---|---|---|---|
| | A | B | C | D |
| Dow 620 Latex | 30 | 30 | 30 | 70 |
| Polyvinyl Alcohol | 61 | 64 | 70 | 30 |
| Dextrose | 9 | 6 | — | — |

Dispersions of the materials described above were cast on glass microscope slides and allowed to dry thoroughly at room temperature. The dried films were smooth and continuous. Films were then examined under a binocular microscope with a magnification range of 10-70× in the following fashion. A drop of distilled water was placed on the film and the film was observed over a 10 minute period. The following observations were made.

TABLE 6

| Film | Observation | Conclusion |
|---|---|---|
| A | Film readily disperses. A milky dispersion of particles is immediately formed. | Not Coalesced |
| B | Film readily disperses. A milky dispersion of particles is immediately formed. | Not Coalesced |
| C | Film readily disperses. A milky dispersion of particles is immediately formed. | Not Coalesced |
| D | Film shortly becomes non-coherent and a milky dispersion of particles soon develops. The film was completely redispersible. | Not Coalesced |

Example 7

Blends were created from among the following materials: a commercially available carboxylated styrene-butadiene latex (Dew CP620NA available from Dow Chemical Co.), a solution prepared from guar gum (Jaguar gum HP-8 Rhone Poulenc Inc.), a solution of hydroxypropyl methylcellulose (mothscsi J12MS-Dow Chemical Co.), a dextrose solution and a solution of enzyme-thinned Pencete® starch (ET Pencote®). Blends were made in the ratios (solids basis). described in Table 7 below.

TABLE 7

| | (Parts by Weight) | | | | | |
|---|---|---|---|---|---|---|
| | A | B | C | D | E | F |
| DOW Latex 620 | 30 | 30 | 30 | 30 | 30 | 30 |
| Guar Gum | — | — | — | 70 | 64 | 61 |
| Methocel | 70 | 64 | 61 | — | — | — |
| Dextrose | — | 6 | — | — | 6 | — |
| ET Pencote ® | — | — | 9 | — | — | 9 |

Dispersions of the materials described above were cast on glass microscope slides and allowed to dry thoroughly at room temperature to form films. Films were then examined under a binocular microscope with a magnification range of 10-70× in the following fashion. A drop of distilled water was placed on each film and the film was observed over a 10 minute period. The following observations were made.

TABLE 8

| Films | Observation | Conclusion |
|---|---|---|
| A | Film breaks up but doesn't redisperse; remains generally intact. | Coalesced |
| B | Film disperses as methocel dissolves. Milky dispersion of particles is soon apparent. The film was completely redispersible. | Noncoalesced |
| C | Film disperses as methocel dissolves. Milky dispersion of particles is soon apparent. | Noncoalesced |

TABLE 8-continued

| Films | Observation | Conclusion |
|---|---|---|
| | The film was completely redispersible. | |
| D | Film breaks up but doesn't redisperse; remains generally intact. | Coalesced |
| E | Film disperses as quar gum dissolves. Milky dispersion of particles soon becomes apparent. The film was completely redispersible. | Noncoalesced |
| F | Film disperses as guar gum dissolves. Milky dispersion of particles soon becomes apparent. The film was completely redispersible. | Noncoalesced |

Example 8

Blends were created from among the following materials: a commercially available carboxylated styrene-butadiene latex (DOW CP620NA) available from Dow Chemical Co.), a solution of Polyethylene glycol 1000 (PEG-1000) and a solution of maltodextrin with a dextrose equivalent of 10 (Maltrin 100-Grain Processing Co.). Blends were made in the ratios (solids basis) described in Table 9 below. A latex only sample was included as a control (C).

TABLE 9

| | (Parts by Weight) | | |
|---|---|---|---|
| | A | B | C |
| Dow 620 Latex | 30 | 30 | 100 |
| PEG 1000 | 70 | — | — |
| Maltrin 100 | — | 70 | — |

Dispersions of the materials described above were cast on glass microscope slides and allowed to dry thoroughly at room temperature. The dried films were smooth and continuous. Films were then examined under a binocular microscope with a magnification range of 10-70× in the following fashion. A drop of distilled water was placed on the film and the film was observed over a 10 minute period. The following observations were made.

TABLE 10

| Film | Observation | Conclusion |
|---|---|---|
| A | Film partially disperses. A milky dispersion of some particles forms. | Partly Coalesced |
| B | Film readily disperses; a milky dispersion of particles is immediately formed. | Not Coalesced |
| C | Film remains intact. | Coalesced |

Example 9

Blends were created from among the following materials: a commercially available carboxylated styrene-butadiene latex (Dow CP620NA available from Dow Chemical Co.), a vinyl acetate-ethylene copolymer latex emulsion with a $T_g$ of about 5° C. (Airflex 500-Air Product & Chemicals Inc.) a natural rubber latex with a $T_g$ that is unreported but is substantially below −20° C. (H-1400-Heveatex Corp.), a neoprene latex with a $T_g$ that is unreported by is substantially below −20° C. (Neoprene Latex 654, DuPont) and enzyme-thinned Pencote® starch. Blends were made in the ratios (solids basis) as described in Table 11 below. Samples of all four latexes were included as controls (D, E, F & G).

TABLE 11

| | (Parts by Weight) | | | | | | |
|---|---|---|---|---|---|---|---|
| | A | B | C | D | E | F | G |
| Dow 620 Latex | — | — | — | 100 | — | — | — |
| Airflex 500 | 50 | — | — | — | 100 | — | — |
| Natural Rubber Latex (Heveatex H-1400) | — | 50 | — | — | — | 100 | — |
| Neoprene Latex (DuPont 654) | — | — | 30 | — | — | — | 100 |
| E.T. Pencote ® | 50 | 50 | 70 | — | — | — | — |

Dispersions of the materials described above were cast on glass microscope slides and allowed to dry thoroughly at room temperature to form films. The were then examined under a binocular microscope with a magnification range of 10–70× in the following fashion. A drop of distilled water was placed on the film and the film was observed over a 10 minute period. The following observations were made illustrate that latices vary in their tendency to coalesce and that large proportions of water soluble polymers will not necessarily inhibit coalescence of latices with very low $T_g$s. $T_g$ is a primary factor that affects the coalescability of water insoluble polymer particles. Other factors include molecular weight, degree of crosslinking, particle size and surface character.

TABLE 12

| Film | Observation | Conclusion |
|---|---|---|
| A | Film remains intact for some time but after several minutes, it becomes less intact and releases a milky dispersion of particles. | Partly Coalesced |
| B | Film remains mostly intact and rather tough. | Largely Coalesced |
| C | Film remains intact for some time but after several minutes, it becomes less intact and releases a milky dispersion of particles. | Partly Coalesced |
| D | Film remains intact. | Coalesced |
| E | Film remains intact. | Coalesced |
| F | Film remains intact. | Coalesced |
| G | Film remains intact. | Coalesced |

In Examples 10–16, various monomers were reacted in the presence of a thinned starch to produce aqueous polymeric dispersions. These reaction products including starch graft copolymers were then dried to produce films and tested for dispersibility.

Example 10

In this example, a thin, lightly oxidized hydroxyethyl starch ether Pencote® (Penford Products Co., Cedar Rapids, Iowa), was enzyme thinned and reacted with butadiene and methylmethacrylate (10A) or with butadiene and acrylonitrile (10B) in two 2 liter Parr reactors (Parr Instruments) in the presence of a potassium persulfate initiator to produce a stable aqueous polymeric dispersion which was dried and redispersed.

In making the samples, a starch slurry containing 1200 grams dry Pencote® starch was cooked in a laboratory bench cooker for about 30 minutes at about 34.4% solids. The cooked starch was then cooled to 88° C. and thinned by adding 360 microliters of alpha-amylase (Canalpha, Biocon, Sarasota, Fla.) to the cooked starch paste. The mixture was held, with stirring, at 88° C. for 1 hour and 40 minutes. To this material, 3 ml hypochlorite (16% available chlorine) was added to deactivate the enzyme. According to this procedure, about 1307 grams of the cooked, thinned paste was added to two 2 liter (Parr Instrument) followed by 13.5 grams potassium persulfate and 173 grams water. To the first 2 liter reactor (Example 10A), 292 grams methylmethacrylate and 158 grams butadiene were also added. To the second 2 liter reactor (Example 10B), 223 grams acrylonitrile and 227 grams butadiene were also added. The mixtures were stirred and heated to about 70° C. and held for 10 hours. The mixtures were allowed to cool to room temperature and the pH was adjusted to about 5.5 with dry $Na_2CO_3$. The reaction products were filtered through a 63 micron (0.0024 inches) screen.

Films were drawn of both products and allowed to air dry overnight. The materials were redispersed according to the following method. About 10 grams of dried material were weighed into a 100 ml beaker. Enough ion exchanged water passed through a 0.2 micron filter was added to each sample to bring total dry solids to about 15%. Each sample was stirred without heating for about 30 minutes and was checked for undissolved material. If all the material (or nearly all the material, i.e., greater than 99%), had gone into dispersion, the sample was filtered through a 63 micron (0.0024 inches) screen and an estimate was made of the amount of undispersed material.

If the sample had a substantial amount of undispersed material (greater than 1 or 2%), heat was applied to the stirring material to raise the temperature to 55°–75° C., and held for 15–60 minutes, depending on how quickly the sample appeared to disperse. The sample was then filtered through a 63 micron (0.0024 inch) screen to determine if all the material had dispersed. According to the above method, the film of 10A dispersed upon heating to 60° C. and produced less than 1% grit. The film of 10B dispersed with no heat and produced less than 1% grit. Accordingly, while the film 10A ultimately redispersed under the application of mechanical agitation and heat, it would not have been considered readily or completely redispersible according to the test method of Example 4 although it is believed that the film of 10B would have been. Accordingly, it is concluded that the coalescable polymer particles of film 10A were coalesced while those of film 10B were noncoalesced.

Example 11

In this example, the enzyme thinned starch ether was reacted with styrene, butadiene and 2-ethylhexyl acrylate in a 2 liter Parr reactor in the presence of a potassium persulfate initiator to produce a reaction product which was a stable aqueous polymeric dispersion.

Specifically, 1277 grams dry Pencote® starch was cooked in a laboratory bench cooker for about 30 minutes at about 38.1% solids. The cooked starch was then cooled to 88° C. and thinned with 280 microliters of alpha-amylase for 1 hour and 10 minutes. To this material was added 3 ml of hypochlorite (16% available chlorine) to deactivate the enzyme. To a 2 liter Parr reactor was added about 1394 grams of the thinned starch paste, 13.8 grams potassium persulfate, 7.2 grams $NaHCO_3$, 34 grams water, 223 grams styrene, 106 grams butadiene and 16 grams 2-ethylhexyl acrylate. The mixture was stirred and heated to about 70° C. and held at this temperature for 8 hours. The mixture was cooled to room temperature and the pH was adjusted to 7.0. A film was drawn of the reaction product material and allowed to air dry overnight. The dry film was redispersed according to the method of Example 10. The film dispersed without heating and produced less than 1% grit. The film would have been considered completely dispersible according to the method of Example 4 and, therefore, it is concluded that the coalescable polymer particles of that film were noncoalesced.

Example 12

In this example, an enzyme converted unmodified cornstarch (ET Pearl) was reacted with styrene and butadiene monomers in the presence of a potassium persulfate free radical initiator to produce a stable aqueous polymeric dispersion. The material was then dried to form a film and redispersed.

Specifically, the pH of an unmodified, untreated starch slurry containing 1100 grams starch at 42% solids was adjusted to about 6.5 with a concentrated $Ca(OH)_2$ solution. The slurry was thinned by adding 280 microliters of alpha-amylase. The slurry and water was added to a steam heated starch cooker to give a final calculated solids of about 37.0%. The water was heated to about 195° F. (with agitation) and the starch/enzyme slurry was added just fast enough so that good mixing could be maintained (about a 22 minutes total addition time). The temperature of the slurry was then maintained at 88° C. for about 40 additional minutes. To this material was added 5 ml hypochlorite (16% available chlorine) to deactivate the enzyme. Evaporation of water during the cooling and thinning of the starch gave a final measured solids of about 45.5%. About 1222 grams of the cooked, thinned paste, 13.8 grams potassium persulfate, 364.5 grams water, 233 grams styrene and 111 grams butadiene were added to a 2 liter Parr reactor. The mixture was stirred and heated to about 69° C. and held for 8 hours. The mixture was allowed to cool to room temperature and the pH was adjusted to about 5.5 with $Na_2CO_3$. The reaction product was filtered through a 63 micron (0.0024 inches) screen.

A film was drawn redispersed according to the procedure used in Example 10. The dried material required heating to 60° C. to redisperse in water and had less than 1% grit. The material would not have been considered completely redispersible according to the test method of Example 4. It is, therefore, concluded that the coalescable polymer particles of that film were coalesced.

Example 13

In this example, Polaris LV (Penford Products Co., Cedar Rapids, Iowa), a thin hydroxyethyl potato starch ether was reacted with styrene and butadiene in the presence of a potassium persulfate initiator to produce a stable aqueous polymeric dispersion which was cast into a film, dried and redispersed.

A 38.3% solids starch slurry, containing 1100 grams dry substance Polaris LV, was thinned by adding 300 microliters of alpha-amylase. The slurry was heated, with stirring, in a steam heated laboratory cooker to 88° C. and held for about 1 hour and 30 minutes. The enzyme was then deactivated with about 3 ml of hypochlorite (16% available chlorine). According to this procedure, about 1470 grams of cooked, thinned paste was added to a 2 liter Parr reactor $Na_2CO_3$, 15.5 grams water, 236 grams styrene and 92 grams butadiene. The mixture was stirred and heated to 69° C. and held at this temperature for 8 hours. The mixture was allowed to cool to room temperature and the pH was adjusted to about 7.0. The reaction product was filtered through a 63 micron (0.0025 inches) screen.

A film was drawn and redispersed according to the procedure used in Example 10. The film dispersed well without heating and produced less than 1% grit. It is believed that the film would have been considered completely dispersible according to the test method of Example 4, and, therefore, it is concluded that the coalescable polymer particles of that film were noncoalesced.

Example 14

In this example, Amaizo 839 (American Maize Products Co., Hammond, Ind.), a highly thinned, waxy corn starch, was reacted with styrene and butadiene in the presence of potassium persulfate initiator to produce a stable aqueous polymeric dispersion.

Specifically, 752 grams dry Amaizo 839 starch was cooked in a laboratory bench cooker for about 2 hours 15 minutes at about 36.9% dry substance solids. After cooling, 470 grams of the cooked paste was placed in a 1 liter Parr reactor along with 4.7 grams potassium persulfate, 2.9 grams $NaHCO_3$, 366 grams water, 76 grams styrene and 33 grams butadiene. The mixture was heated, with stirring, to about 69° C. and held at this temperature for 8 hours. The mixture was cooled and filtered through a 63 micron (0.0024 inch) screen. A film was drawn of the reaction product and allowed to air dry overnight. The dry film was redispersed according to the procedure used in Example 10. The film dispersed on heating to 60° C. and provided less than 1% grit. It is believed that the material would not have been considered to be completely dispersible according to the test method of Example 4, and, therefore, it is concluded that the coalescable polymer particles of the film are coalesced.

Example 15

In this example, Star-Dri 5 (A. E. Staley Manufacturing Co., Decatur, Ill.), a waxy corn starch 5 DE maltodextrin, was reacted with styrene and butadiene in the presence of potassium persulfate initiator to produce a stable aqueous polymeric dispersion.

Specifically, 270 grams dry Star-Dri 5 was combined with 442 grams water, 6.6 grams potassium persulfate, 112 grams styrene and 53 grams butadiene in a 1 liter Parr reactor. The mixture was heated, with stirring, to about 69° C. and held at this temperature for 8 hours. The mixture was cooled and filtered through a 63 micron (0.0024 inches) screen. A film was drawn of the material and allowed to air dry overnight. The dry film was redispersed according to the procedure used in Example 10. The film dispersed very well without heating and provided less than 1% grit. It is believed that the film would have been considered completely dispersible according to the test method of Example 4 and, therefore, it is concluded that the coalescable polymer particles of the film are not coalesced.

Example 16

In this example, Dow 620 latex (Dow Chemical Co., Midland, Mich.), was combined with a number of different types of modified corn starch. The resulting dispersions were dried as films, redispersed and used as the binder to prepare coating color compositions which were then coated onto paper. These coated papers were then compared to papers which had been coated with coating compositions made from the same dispersions before they had been dried and redispersed.

For this example, five sets of paper were coated. One half of each set consisted of papers coated with coating color compositions made with a binder consisting of a dried and redispersed Dow 620 latex in combination with a modified corn starch. The other half of each set consisted of papers coated with coating color compositions made with the same binders, but after they had been dried and redispersed.

Specifically, Dow 620 latex was combined with five different modified corn starches at a ratio of 38.3% dry weight Dow 620 latex to 61.7% dry weight of the modified corn starch. The latex and starch were combined by slowly adding the latex to the starch with very good agitation. The first set of papers (13A and 13B in Table 13) were coated with a coating color composition made with a paper coating binder composition of 38.3% dry weight basis Dow 620 latex and 61.7 dry weight basis enzyme thinned, unmodified corn starch (ET Pearl). The ET Pearl starch was made using the same method as that used to produce the ET Pearl corn starch used in Example 12. The next set of papers, (13C and 13D in Table 13) were coated with a coating color made with a paper coating binder composition of 38.3% dry weight basis Dow 620 latex and 61.7% dry weight basis Penford Gum 290 starch (Penford Products Co., Cedar Rapids, Iowa). The Penford Gum 290 starch was cooked, but not enzyme thinned, in laboratory bench cooker using the method described in Example 11.

The next set of papers (13E and 13F in Table 13) were coated with a coating color composition made with a paper coating binder composition of 38.3% dry weight basis Dow 620 latex and 61.7% dry weight basis Star Dri 5 maltodextrin. The Star Dri 5 maltodextrin was first slurried in water at 49% solids dry weight basis. The Dow 620 latex was then combined with this slurry.

The next set of papers (13G and 13H in Table 13) were coated with a coating color composition made with a paper coating binder composition of 38.3% dry weight basis Dow 620 latex and 61.7% dry weight basis Fro-Dex 22 (American Maize Products Co., Hammond, Ind.). The Fro-Dex 22 was first slurried in water at 50% solids dry weight basis. The Dow 620 latex was then combined with this slurry.

The final set of papers (13I and 13J in Table 13) were coated with a coating color composition made with a paper coating binder comprising a cooked Penford Gum 290 starch as described in Example 8 in combination with a slurry of CANTAB® corn syrup solids. (97 DE 95% dextrose corn syrup solids, Penford Products Co., Cedar Rapids, Iowa) and water at a ratio of 70% dry weight basis Penford Gum 290 and 30% dry weight basis CANTAB® corn syrup solids. Dow 620 latex was then added slowly to this mixture under agitation at a ratio of 38.3% Dow 620 latex to 61.7% dry basis of the Penford Gum 290 starch/CANTAB® corn syrup solids blend (38.3% Dow 620 latex, 43.2% Penford Gum 290 Starch, 18.5% CANTAB® corn syrup solids).

The paper coating color compositions of this example were prepared by mixing the binders as described above, with a 70% solids clay slip and then adjusting the pH to 8.3–8.8. The clay slip was prepared by adding Nuclay (Englehard) to tap water containing a 0.04% polyacrylate/NaOH dispersant (42% solids) on the clay (commercial solids basis). After adding the above binders to the clay slip and adjusting the pH with ammonium hydroxide, the coating colors were thoroughly mixed. A typical coating formula included:

| Composition | Parts |
|---|---|
| No. 1 delaminated clay (Nuclay) | 100 |
| Binder | 18 |
| Total Solids | 59–66% |
| pH | 8.3–8.8 |

A 28 lb. per 3,300 square foot unsized, uncalendered, base stock was coated with the coating colors on a bench size trailing blade coater. Coating colors were applied at room temperature and immediately dried in an infrared in an infrared dryer (CCR Enterprises, St. Louis, Mo.). Adjustments in coating weights were made by varying the trailing blade pressure. All coated samples were conditioned at 50% relative humidity and 23° C. before testing.

The coated sheets were calendered on a B. F. Perkins & Sons supercalender (Chicopee, Mass.). Calendering conditions were: roll pressure of 1000 lb/linear inch; a roll speed of 78 feet per minute and a roll temperature of 150° F. Each sheet was calendered through 4 nips.

After coating and calendering of the paper stock, it was tested for gloss and IGT. Gloss determinations were made by averaging roughly ten measurements per sheet for three or four coated and calendered sheets of each type on a 75° Glossgard II Glossmeter (Pacific Scientific, Silver Spring, Md.). IGT analysis were run on a Reprotest IGT Printability Tester (Reprotest North America, Cherry Hill, N.J.).

The results of testing the coating color compositions indicate significant differences in properties between the fresh and redispersed blends of Dow 620 latex with either enzyme thinned Pearl starch or Penford gum 290 starch. The dramatic increase in coating color viscosity shows that the dried blends of these materials did not completely redisperse so as to duplicate the properties of the fresh binder mixtures. Accordingly, it can be concluded that at least some of the coalescable polymer particles in the blend had coalesced.

In contrast, the blends of Star Dri 5 maltodextrin and Fro-Dex 22 starch hydrolyzate products with Dow 620 latex appeared to completely redisperse given the equivalence of coating color dispersions comprising the fresh and redispersed blends. It was thus concluded that the coalescable latex particles in the dried dispersions remained substantially noncoalesced.

The Dow 620 latex/CANTAB® corn syrup solids/Penford Gum 290 blend exhibited a significant increase in viscosity upon drying and redispersion, indicating that the coalescable polymer particles failed to remain substantially noncoalesced.

TABLE 13

| Run No. | Binder Composition | Viscosity of the Coating Colors (cps) | Viscosity[6] Coating Color Solids (%) | Coating[7] Solids % | Gloss % | IGT[5] (cm/sec) |
|---|---|---|---|---|---|---|
| 13A | Dow 620/ET Pearl (fresh) | 690[1] | 64.7 | 64.7 | 68.0 | 35 |
| 13B | Dow 620/ET Pearl (redispersed) | 1925[1] | 65.0 | 62.5 | 69.2 | 37 |
| 13C | Dow 620/PG 290 (fresh) | 5450[2] | 61.0 | 61.0 | 62.8 | 37 |
| 13D | Dow 620/PG 290 (redispersed) | 9200[3] | 61.0 | 59.0 | 66.1 | 34 |
| 13E | Dow 620/Star Dri 5 (fresh) | 1320[1] | 64.0 | 64 | 67.5 | 35 |
| 13F | Dow 620/Star Dri 5 (redispersed) | 1225[1] | 64.0 | 64 | 67.3 | 34 |
| 13G | Dow 620/Fro-Dex 22 (fresh) | 190[4] | 66.0 | 66 | 69.2 | 35 |
| 13H | Dow 620/Fro-Dex 22 (redispersed) | 172[4] | 66.0 | 66 | 69.4 | 35 |
| 13I | Dow 620/CANTAB/PG 290 (fresh) | 2890[2] | 62.0 | 62 | 62.59 | 37 |
| 13J | Dow 620/CANTAB/PG 290 (redispersed) | 4980[2] | 62.0 | 61 | 62.51 | 37 |

[1]Model RVF Brookfield Viscometer, Spindle #3, 20 rpm.
[2]Model RVF Brookfield Viscometer, Spindle #4, 20 rpm.
[3]Model RVF Brookfield Viscometer, Spindle #5, 20 rpm.
[4]Model RVF Brookfield Viscometer, Spindle #2, 20 rpm.
[5]Spring setting 35 kg, Medium viscosity oil, Pendulum drive.
[6]% Solids for viscosity determinations.
[7]% Solids for coating operation.

Example 17

In this example, a sample of PENGLOSS® binder (Penford Products Co., Cedar Rapids, Iowa) was freeze-dried, redispersed and used as a binder in a coating color to coat paper.

The PENGLOSS® sample was first diluted to 20% solids with ion exchanged water and then freeze-dried in a (Lyph-Lock 6 freeze drier (Labconco Corporation, Kansas City, Mo.). The freeze-dried product was redispersed with ion exchanged water at 50% solids. The redispersed material was then used as the binder in a coating color to coat paper according to the method used in Example 16. The results are shown in Table 14 below.

TABLE 14

Coating Data for Redispersed Freeze-Dried PENGLOSS ®

| Sample | Gloss % | IGT (ft/min) |
|---|---|---|
| PENGLOSS ® | 69.9 | 96.1 |
| Redispersed PENGLOSS ® | 68.0 | 91.3 |

Example 18

In this example, pilot plant prepared styrene-butadiene/ starch reaction product (PENGLOSS® binder) was spray dried in a laboratory spray dryer. Specifically, PENGLOSS® binder was prepared from enzyme thinned Pencote® starch by reacting it with dry solids styrene and butadiene in the weight ratio of 100 parts E.T. Pencote® starch and 42 parts styrene/20 parts butadiene. The reaction was initiated by 1.8% potassium persulfate on dry substance starch. The reaction mass was heated to 162° F. and held at 160° F. for a total of 8 hours. The resulting PENGLOSS® binder had a solids content of 50.4%.

The PENGLOSS® binder was spray dried in a laboratory Nifo (Nichols Engineering Research Corp.) pilot spray dryer unit. The inlet air was heated by direct gas firing. The inlet temperature was set at 356° F., and flow of PENGLOSS® binder started at a rate of 5 gal/hr. The exhaust temperature was 221° F. After the system equilibrated, samples were collected. The material was screened through a standard 45 mesh screen before testing for redispersibility and coating data. Coating data were obtained according to the procedure used in Examples 16 and 19. Coating results are shown in Table 15. These results show that the spray dried and redispersed PENGLOSS® binder produces coating color compositions having essentially the same physical properties as the nondried and redispersed material.

TABLE 15

Coating and Data for Spray Dried and Redispersed PENGLOSS ® Binder

| | | Coating Data | | | |
|---|---|---|---|---|---|
| Run No. | Sample | Coating Color Viscosity | Coating Color Solids | Gloss % | IGT[2] (cm/sec) |
| 15A | PENGLOSS ® binder before spray drying | 1335[1] | 63.0 | 64 | 46 |
| 15B | PENGLOSS ® binder after spray drying and redispersion | 1280[1] | 63.0 | 66 | 47 |

[1]Model RVF Brookfield Viscometer, Spindle #3, 20 rpm.
[2]Spring Setting 35 kg, Medium Viscosity Oil, Pendulum Drive.

Example 19

According to this example, coating color compositions were produced comprising liquid PENGLOSS® binder, spray dried PENGLOSS® binder according to Example 18 and liquid reconstituted spray dried PENGLOSS® binder which comprised the spray dried material of Example 18 reconstituted in water. The binders were each added to two pigment systems with 70% and 76% solids, respectively, and lubricants were incorporated into some of the coating color compositions.

Clay slips of Nuclay (Englehard) and Hydrasperse (J. M. Huber Corp.) were prepared at 70% solids by adding the clay to tap water containing 0.04–0.05% polyacrylate/NaOH dispersant (commercial solids bases) based on the clay. Carbital 90, a calcium carbonate (E.C.C. America Inc.) at 76% solids was used as received in slurry form.

Coating color compositions were prepared with and without lubricant. Coating color compositions with Nopcote C-104 (Henkel Corp.) used as the lubricant, were pH adjusted to 8.3–8.6 with ammonium hydroxide prior to lubricant addition. Coating color compositions with Berchem 4113 (Bercen Inc.) used as the lubricant, were pH adjusted with ammonium hydroxide to 8.3–8.6 after lubricant addition. All coating colors were thoroughly mixed.

A 28 pound per 3300 square foot unsized, uncalendered, base stock was coated, calendered and tested with equipment at conditions described in Example 16. Results are shown in Table 16 below. A comparison of Runs 16A and 16B shows that the dried and redispersed PENGLOSS® binder produces a coating color having substantially the same viscosity as the never dried binder. Runs 16D and 16E illustrate the utility of the binder at paper coating at high solids levels of 70% whether added as a liquid dispersion (16D) or as dry solids (16E). Runs 16F and 16G illustrate the utility of the binder for making coating colors with extremely high solids levels of 74%.

(J. T. Baker Chemical Co.); 0.12 grams preservative (orthophenylphenol, Aldrich Chemical Co.); 0.66 grams defoamer (Colloid 581, Rhone Poulenc); and 117.22 grams water.

The product mixture was filtered through a No. 100 mesh sieve and drawn down into a film on Mylar film. The film was thoroughly dried at room temperature for three days. When the film was subjected to the slide test of Example 4, the film was very slow to breakup (4–5 minutes) and then flaked off, slowly becoming thick and soupy as the polyvinyl alcohol dissolved. Accordingly, the film was not considered completely redispersible, and it was concluded that the coalescable polymer particles were at least partially coalesced.

Numerous modifications and variations of the above-described invention are expected to occur to those of skill in the art. Accordingly, only such limitations as appear in the appended claims should be placed thereon.

TABLE 16

| Run No. | Binder Compositions | Coating Color Compositions | Lubricant: Type & Amt (Pts based on Clay) | Coating Color Solids % | Coating Color Viscosity at 20 rpm (cps) | Coat Weight (lb/side) | Gloss % | IGT[3] (cm/sec) |
|---|---|---|---|---|---|---|---|---|
| 16A | PENGLOSS® | 100 parts Nuclay/ 18 parts binder | None | 63 | 1170[1] | 6.5 | 64.3 | 36 |
| 16B | PENGLOSS® (redispersed at 60% solids) | 100 parts Nuclay/ 18 parts binder | None | 63 | 930[1] | 6.9 | 65.4 | 39 |
| 16C | PENGLOSS® (redispersed at 60% solids) | 100 parts Nuclay/ 18 parts binder | Nopcote C-104 1.0 part | 63 | 1140[1] | 6.9 | 66.7 | 39 |
| 16D | PENGLOSS® (redispersed at 60% solids) | 50 parts Carbital 90/ 50 parts Hydrasperse/ 18 parts binder | None | 70 | 3700[1] | 8.4 | 62.9 | 40 |
| 16E | PENGLOSS® (redispersed at 60% solids) | 50 parts Carbital 90/ 50 parts Hydrasperse/ 18 parts binder | Nopcote C-104 1.0 part | 70 | 3910[1] | 8.4 | 63.7 | 40 |
| 16F | PENGLOSS® (spray dried- added dry) | 100 parts Carbital 90/ 18 parts binder | None | 74 | 8220[2] | 9.5 | 55.9 | 42 |
| 16G | PENGLOSS® (spray dried- added dry) | 100 parts Carbital 90/ 18 parts binder | BERCHEM 4113 0.8 pts | 74 | 11000[2] | 9.5 | 56.6 | 40 |

[1]Model RVF Brookfield Viscometer, Spindle #4.
[2]Model RVF Brookfield Viscometer, Spindle #5.
[3]Medium Viscosity Oil, Pendulum drive, 350 N/cm.

Example 20

In this example, a polyvinyl acetate/polyvinyl alcohol film was produced according to Example 1 of Columbus, et al., U.S. Pat. No. 3,442,845. The procedure of that example was followed using 62.86 grams of polyvinyl acetate latex (55% solids, 5,000 cps, nonionic, 3 micron average particle size, Unocal 6206, Unocal Corp.); 14.06 grams of polyvinyl alcohol (87–89% degree of hydrolysis; medium molecular weight and 23–27 cps (4% aq. solution at 20° C.), Airvol 523, Air Products and Chemicals, Inc.), 4.88 grams glycerol

What is claimed is:

1. A coated paper comprising a substrate and a coating binder thereon wherein the coating binder comprises (a) a water insoluble component comprising noncoalesced coalescable polymer particles which have a $T_g$ less than 55° C. and a majority of which have a particle size of less than 1 micron; and (b) a water soluble component comprising a water soluble polymer capable of inhibiting coalescence of said polymer particles, or a water soluble polymer and a component capable of inhibiting coalescence of said polymer particles; wherein said coalescable water insoluble component comprises greater than 3% by weight of the binder solids and said water soluble component comprises greater than about 25% by weight of said binder solids.

2. Printed paper comprising the coated paper of claim 1.

3. A method of printing comprising printing on the paper of claim 1.

4. A method for coating a substrate comprising the steps of applying to said substrate a coating color composition comprising a pigment and a binder comprising a stable aqueous dispersion capable of forming, at about 70° F., a film reinforced with coalescable water insoluble polymer particles, which particles are substantially noncoalesced, said dispersion comprising a water insoluble component and a water soluble component wherein:

(a) the water insoluble component comprises said coalescable polymer particles which have a $T_g$ less than 55° C. and a majority of which have a particle size of less than 1 micron; and (b) the water soluble component comprises a water soluble polymer capable of inhibiting coalescence of said polymer particles, or a water soluble polymer and a component capable of inhibiting coalescence of said polymer particles; wherein when said water soluble component consists of a starch alone, said starch is a starch hydrolyzate product having an intrinsic viscosity of less than 0.12 dl/g;

and wherein said coalescable water insoluble particles comprise greater than 3% by weight of the solids making up said dispersion and said water soluble component comprises greater than about 25% by weight of said solids to form a coating and drying said coating.

5. The method of claim 4 wherein said substrate is paper.

6. Paper coated with a coating color composition according to the method of claim 5.

7. Printed paper comprising paper coated with a coating color composition according to the method of claim 5 prior to printing.

8. A method of printing comprising printing on paper coated with a coating color composition according to the method of claim 5.

9. The method of claim 4 wherein the coating color composition is applied at a concentration of greater than 60% solids by weight.

* * * * *

UNITED STATES PATENT AND TRADEMARK OFFICE
CERTIFICATE OF CORRECTION

PATENT NO. : 5,667,885

DATED : September 16, 1997

INVENTOR(S) : Nguyen et al.

It is certified that error appears in the above-identified patent and that said Letters Patent is hereby corrected as shown below:

Column 3, line 57, "weights;" should be --weight;--.

Column 10, line 31, "initial:or" should be --initiator--.

Column 11, line 38, "80°C" should be --85°C--.

Column 15, line 5, "commercial" should be --commercially--.

Column 15, line 25, "dried to dried to" should be --dried to--.

Column 15, line 65, "(ET Pencotes)" should be --(ET Pencote®)--.

Column 16, line 8, "(ET Pencote® Starch" should be --ET Pencote®--.

Column 17, line 31, "(mothscsi" should be --(methocel--.

Column 18, line 9, "quar" should be --guar--.

Column 19, line 2, "by" should be --but--.

UNITED STATES PATENT AND TRADEMARK OFFICE
CERTIFICATE OF CORRECTION

PATENT NO. : 5,667,885

DATED : September 16, 1997

INVENTOR(S) : Nguyen et al.

It is certified that error appears in the above-identified patent and that said Letters Patent is hereby corrected as shown below:

Column 19, line 22, "The" should be --They--.

Column 24, lines 20-21, "in an infrared in an infrared" should be --in an infrared--.

Column 25, line 62, "Nifo" should be --Niro--.

Signed and Sealed this

First Day of December, 1998

*Attest:*

*Attesting Officer*

BRUCE LEHMAN

*Commissioner of Patents and Trademarks*